United States Patent
Kumar et al.

(10) Patent No.: US 12,307,817 B2
(45) Date of Patent: May 20, 2025

(54) METHOD AND SYSTEM FOR AUTOMATICALLY CAPTURING AND PROCESSING AN IMAGE OF A USER

(71) Applicant: SAMSUNG ELECTRONICS CO., LTD., Suwon-si (KR)

(72) Inventors: Aditya Kumar, Noida (IN); Natasha Meena, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 17/885,907

(22) Filed: Aug. 11, 2022

(65) Prior Publication Data

US 2023/0066331 A1    Mar. 2, 2023

Related U.S. Application Data

(63) Continuation of application No. PCT/KR2022/011301, filed on Aug. 1, 2022.

(30) Foreign Application Priority Data

Aug. 11, 2021    (IN) .............................. 202111036374

(51) Int. Cl.
    *G06V 40/16*    (2022.01)
    *G06T 7/254*    (2017.01)
    (Continued)

(52) U.S. Cl.
    CPC ............ *G06V 40/174* (2022.01); *G06T 7/254* (2017.01); *G06T 7/70* (2017.01); *G06V 40/20* (2022.01); *G06T 2207/20224* (2013.01)

(58) Field of Classification Search
    None
    See application file for complete search history.

(56) References Cited

U.S. PATENT DOCUMENTS 9,159,151 B2    10/2015   Perez et al.
9,519,989 B2    12/2016   Perez et al.
(Continued)

FOREIGN PATENT DOCUMENTS

CN    104333688 B    7/2018
EP       3934268 A1   1/2022
(Continued)

OTHER PUBLICATIONS

US 11,388,126 B2, 07/2022, Kennedy (withdrawn)
(Continued)

*Primary Examiner* — Delomia L Gilliard
(74) *Attorney, Agent, or Firm* — Sughrue Mion, PLLC

(57) ABSTRACT

A method for automatically capturing and processing an image of a user is provided. The method includes determining a level of an emotion identified from a multimedia content; determining an adjusted emotion level by adjusting the level of the emotion based on user information; capturing a plurality of images of the user over a period of time, based on the adjusted emotion level being greater than a first threshold and a reaction of the user determined based on the plurality of images, being less than a second threshold; prioritizing the plurality of images based on at least one of a frame emotion level of the plurality of images, facial features of the user in the plurality of images, or a number of faces in the plurality of images; and processing the prioritized images to generate an output.

15 Claims, 40 Drawing Sheets

(51) Int. Cl.
*G06T 7/70* (2017.01)
*G06V 40/20* (2022.01)

(56) References Cited

U.S. PATENT DOCUMENTS

| | | | |
|---|---|---|---|
| 9,576,190 B2* | 2/2017 | Shaburov | G06T 7/337 |
| 9,760,767 B1 | 9/2017 | Bonazzoli et al. | |
| 9,900,498 B2 | 2/2018 | Kim et al. | |
| 10,176,619 B2* | 1/2019 | Jiao | G06T 7/246 |
| 10,387,717 B2 | 8/2019 | Li et al. | |
| 10,529,379 B2 | 1/2020 | Chintalapoodi et al. | |
| 10,755,087 B2* | 8/2020 | Rajvanshi | G06V 40/176 |
| 2004/0081338 A1* | 4/2004 | Takenaka | G06T 5/70 382/118 |
| 2005/0223237 A1* | 10/2005 | Barletta | H04N 21/4402 348/E5.002 |
| 2016/0050169 A1 | 2/2016 | Ben Atar et al. | |
| 2016/0088355 A1 | 3/2016 | Zubarieva et al. | |
| 2016/0358013 A1* | 12/2016 | Carter | G06F 21/32 |
| 2017/0178287 A1* | 6/2017 | Anderson | G06V 40/174 |
| 2017/0364484 A1 | 12/2017 | Hayes | |
| 2018/0082313 A1 | 3/2018 | Duggin et al. | |
| 2018/0150722 A1 | 5/2018 | Du et al. | |
| 2018/0330152 A1* | 11/2018 | Mittelstaedt | G06V 40/167 |
| 2019/0199663 A1* | 6/2019 | Liu | H04M 1/72436 |
| 2019/0205626 A1* | 7/2019 | Kim | G06V 40/161 |
| 2020/0074156 A1* | 3/2020 | Janumpally | G06V 40/173 |
| 2020/0139077 A1* | 5/2020 | Biradar | G10L 25/63 |
| 2020/0296480 A1 | 9/2020 | Chappell, III et al. | |
| 2021/0241444 A1* | 8/2021 | Cyrus | G06T 7/0002 |

FOREIGN PATENT DOCUMENTS

| | | |
|---|---|---|
| GB | 2585261 A | 1/2021 |
| JP | 4891802 B2 | 3/2012 |
| JP | 5917841 B2 | 5/2016 |
| KR | 10-1700468 B1 | 1/2017 |
| KR | 10-1704848 B1 | 2/2017 |
| KR | 10-1838792 B1 | 3/2018 |
| KR | 10-2020-0078705 A | 7/2020 |
| KR | 10-2021-0012528 A | 2/2021 |
| KR | 10-2021-0078863 A | 6/2021 |
| KR | 10-2021-0089248 A | 7/2021 |

OTHER PUBLICATIONS

Affective computing: Emotion sensing using 3D images. Madhusudan et al. (Year: 2016).*
"What is AR Zone on the Galaxy S20", Samsung, Oct. 15, 2021, 8 pages total.
Andre Violante, "Simple Reinforcement Learning: Q-learning", Towards Data Science, Mar. 19, 2019, 6 pages total.
Manuel G. Calvo et al., "Recognition Thresholds for Static and Dynamic Emotional Faces", Emotion, 2016, vol. 16, No. 8, American Psychological Association, Jun. 30, 2016, 15 pages total.
M. Pantic et al., "An Expert System for Multiple Emotional Classification of Facial Expressions", ResearchGate, IEEE Xplore, DOI: 10.1109/TAI.1999.809775, Feb. 1999, 10 pages total.
Shichuan Du et al., "Wait, are you sad or angry? Large exposure time differences required for the categorization of facial expressions of emotion", Journal of Vision, 13, 4, 13, doi: 10.1167/13.4.13, Mar. 18, 2013, 14 pages total.
International Search Report (PCT/ISA/220 and PCT/ISA/210) and Written Opinion (PCT/ISA/237) issued by the International Searching Authority in International Application No. PC/TKR2022/011301, on Nov. 4, 2022.
Extended European Search Report dated Sep. 17, 2024 issued by the European Patent Office in European Application No. 22856083.5.
Kaliouby et al., ; "FAIM: Intergrating Automated Facial Affect Analysis in Instant Messaging", pp. 244-246 (3 pages total) 2004.
Teixeira et al., "Determination of emotional content of video clips by low-level audiovisual features ; a dimensional and categorical experimental approach", Multimed Tools Appl, 2011, vol. 61, pp. 21-49 (29 pages total).

* cited by examiner

Base values for weights of SNF for Emotion = scared

Gradient Descent $$w = w - L.R. * \Delta w$$
$$b = b - L.R. * \Delta b$$
where
w = (s,n,f) and b = bias
L.R. = Learning Rate Prioritized Pair(s) in each category

METHOD AND SYSTEM FOR AUTOMATICALLY CAPTURING AND PROCESSING AN IMAGE OF A USER

CROSS-REFERENCE TO THE RELATED APPLICATION(S)

This application is a bypass continuation application of International Application No. PCT/KR2022/011301, filed Aug. 1, 2022, in the Korean Intellectual Property Receiving Office and claiming priority to Indian Patent Application No. 202111036374, filed on Aug. 11, 2021, the disclosures of which are incorporated by reference herein in their entireties.

TECHNICAL FIELD

The disclosure relates to a method for intelligent automated camera controlling and prioritizing. In particular, the disclosure relates to a method and a system automatically capturing and processing an image of a user.

BACKGROUND ART

The trend of generating personalized media is becoming very popular, as shown in FIGS. 1A and 1B. FIGS. 1A and 1B illustrate such trend. Examples of ongoing trends in making the personalized media are as follows.
  User clicks a picture of himself—Avatar creation with features best matching to the picture (contextual/statistical analysis of picture).
  User clicks a picture of himself—A Cartoonified sticker, emote is generated (Media creation is based on using Vison API(s) from OpenCV)
  User clicks a picture of himself—Emoji/GIF suggestion closest matching to the picture (contextual or statistical analysis of picture).
  Media filters in a video call—A filter is applied in real time to a user's face cartoonifying the face (face recognition and feature extraction).
  By recording real reactions of a user, it allows to create a more personalized avatar for the user with personalized reactions.

However, personalized media (such as personalized Graphics Interchange Format (GIF), stickers, emoji's avatars, etc.) may look like user but do not act like user. For example, the avatars generated look like the user but do not act like the user. The avatars generated using the related art technologies do not have any personalized actions. The avatars' actions are fixed and predetermined irrespective of user's true emotions and actions. Also, the user needs to manually generate personalized media, and no automated camera control exists. The camera of the devices is not intelligent enough to record only a meaningful content, thereby capturing user's true emotion. The recorded video frames of the user may contain meaningless content which user may need to edit and remove later, and therefore, there is a need for an automated filming and editing method.

In the related art, the generation of media is solely dependent on the user's input to the camera to generate any media. There is no existing method to automatically capture candid images of a user. To capture cherished moments in everyday life and reduce the user's inconvenience to manually operate to photograph or record media, there is a need for automation of camera to start automatically. Further, the media and/or avatar created from any of the related art methods lack variety because the generated media for any user uses the same style of changing avatars in the media. Also, the generated media using the related art methods lack a lot of emotions in the media to correctly explain the current feeling. The related art methods have the below drawbacks:
  The related art methods only have specific features based camera control such as automatically taking a photo when everyone is smiling, asking "Did someone blink?", red eye detection. There is no generalized method which works for all cases.
  The related art methods do not focus on the automation of a camera or media generation.

Also, the current technologies lack an element of personalization in the media generation. The technologies do not take into account of automation or media generation for all of the user's emotion. There is no technology for context based automation in video capturing which takes into account the emotion in the context. Also, emotions in media are not personalized for the user and thus cannot correctly depict the mood of the user.

SUMMARY

This summary is provided to introduce concepts that are further described in the detailed description of the disclosure. This summary is not intended to limit or define the scope of the disclosure.

According to an aspect of an example embodiment of the disclosure, provided is a method for automatically capturing and processing an image of a user. The method may include determining a level of an emotion identified from a multimedia content. The method may include determining an adjusted emotion level of the multimedia content by adjusting the level of the emotion based on user information. The method may include capturing a plurality of images of the user over a period of time, based on the adjusted emotion level being greater than a first threshold and a reaction of the user determined based on the plurality of images, being less than a second threshold. The method may include prioritizing the plurality of images based on at least one of a frame emotion level of the plurality of images, facial features of the user in the plurality of images, or a number of faces in the plurality of images. The method may include processing the prioritized images to generate an output.

According to an aspect of an example embodiment of the disclosure, provided is an electronic device for automatically capturing and processing an image of a user. The electronic device may include at least one processor The at least one processor may be configured to determine a level of an emotion identified from a multimedia content. The at least one processor may be configured to determine an adjusted emotion level of the multimedia content by adjusting the level of the emotion based on user information. The at least one processor may be configured to capture a plurality of images of the user over a period of time, based on the adjusted emotion level being greater than a first threshold and a reaction of the user determined based on the plurality of images, being less than a second threshold. The at least one processor may be configured to prioritize the plurality of images based on at least one of a frame emotion level of the plurality of images, facial features of the user in the plurality of images, or a number of faces in the plurality of images. The at least one processor may be configured to process the prioritized images to generate an output.

According to an aspect of an example embodiment of the disclosure, provided is a computer-readable medium. The computer-readable medium storing instructions that, when executed by one or more processors of an electronic device.

The computer-readable medium may cause the one or more processors to determining a level of an emotion identified from a multimedia content. The computer-readable medium may cause the one or more processors to determining an adjusted emotion level of the multimedia content by adjusting the level of the emotion based on user information. The computer-readable medium may cause the one or more processors to capturing a plurality of images of the user over a period of time, based on the adjusted emotion level being greater than a first threshold and a reaction of the user determined based on the plurality of images, being less than a second threshold. The computer-readable medium may cause the one or more processors to prioritizing the plurality of images based on at least one of a frame emotion level of the plurality of images, facial features of the user in the plurality of images, or a number of faces in the plurality of images. The computer-readable medium may cause the one or more processors to processing the prioritized images to generate an output.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1A:
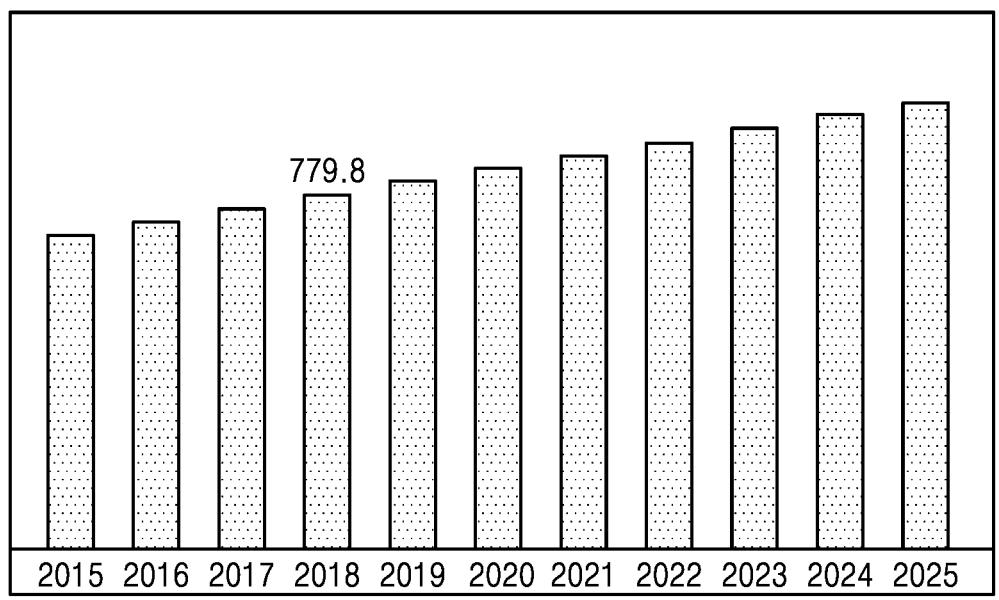
FIGS. 1A and 1B illustrate trend of using personalized content.
Figure 1B:
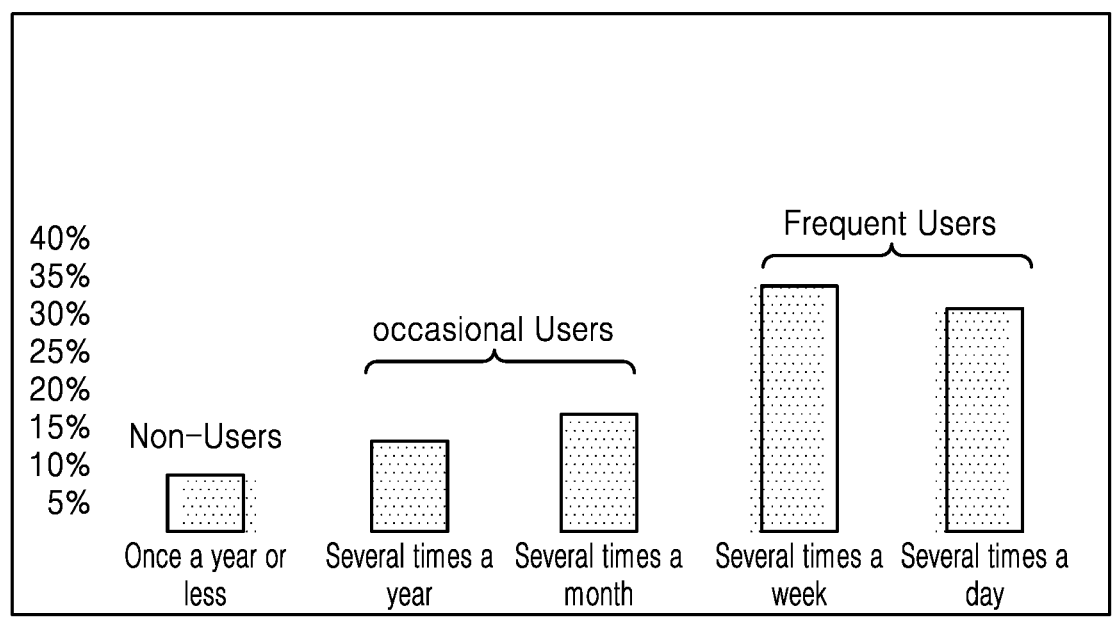

To further clarify the advantages and features of the disclosure, a description of the disclosure will be provided with reference to example embodiments thereof, which are illustrated in the accompanying drawing. It is appreciated that these drawings depict only a few example embodiments of the disclosure and are therefore not to be considered limiting its scope. The disclosure will be described and explained with additional specificity and detail with the accompanying drawings.

Further, skilled artisans will appreciate that elements in the drawings are illustrated for simplicity and may not have been necessarily drawn to scale. For example, flow charts illustrate methods in terms of the most prominent steps involved to help to improve understanding of aspects of the disclosure. Furthermore, in terms of the construction of the device, one or more components of the device may be represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Regardless of whether a certain feature or element is limited to being only one feature or element, the certain feature or element may be referred to as "one or more features" or "one or more elements" or "at least one feature" or "at least one element" Furthermore, the use of the terms "one or more" or "at least one" feature or element do NOT preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having an ordinary skill in the art.

Example embodiments of the disclosure will be described below in detail with reference to the accompanying drawings.

Figure 2A:
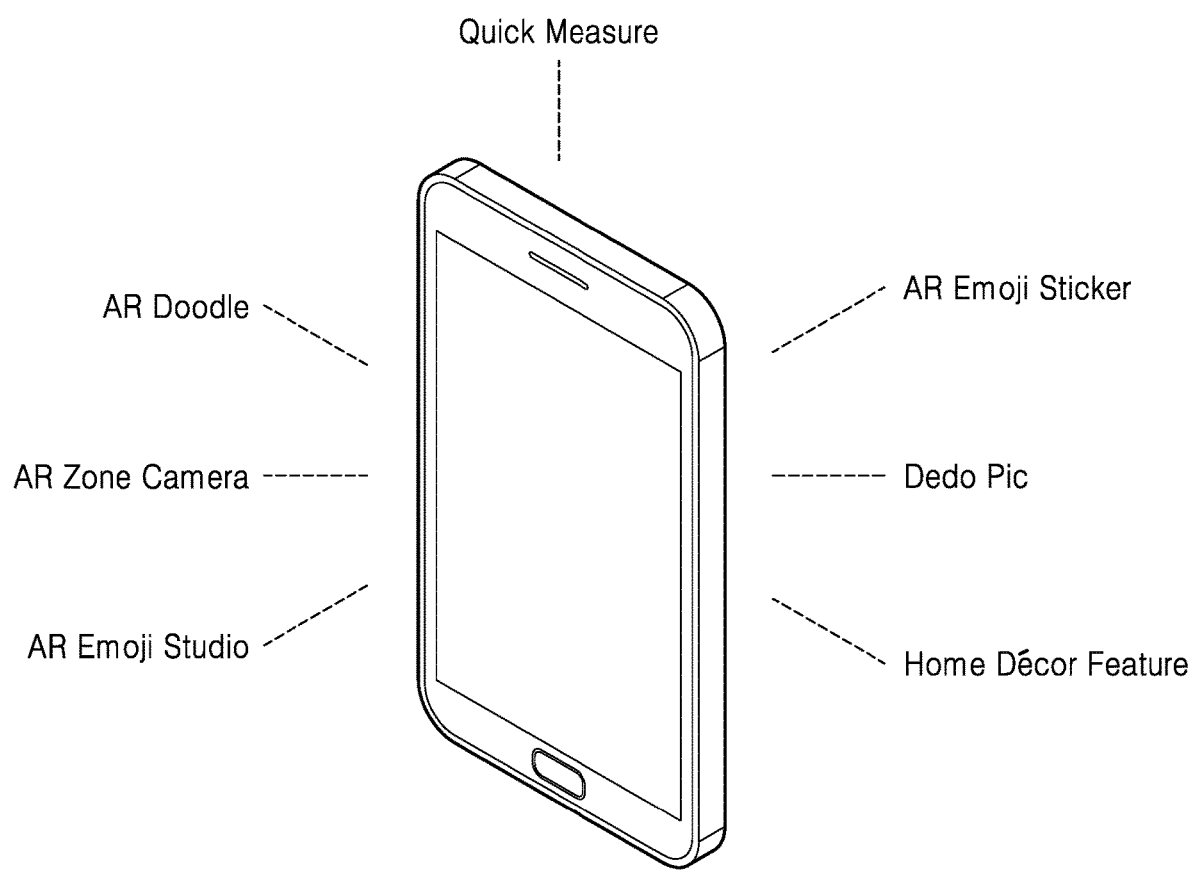
FIGS. 2A and B illustrate related techniques for generating personalized content.
Figure 2B:
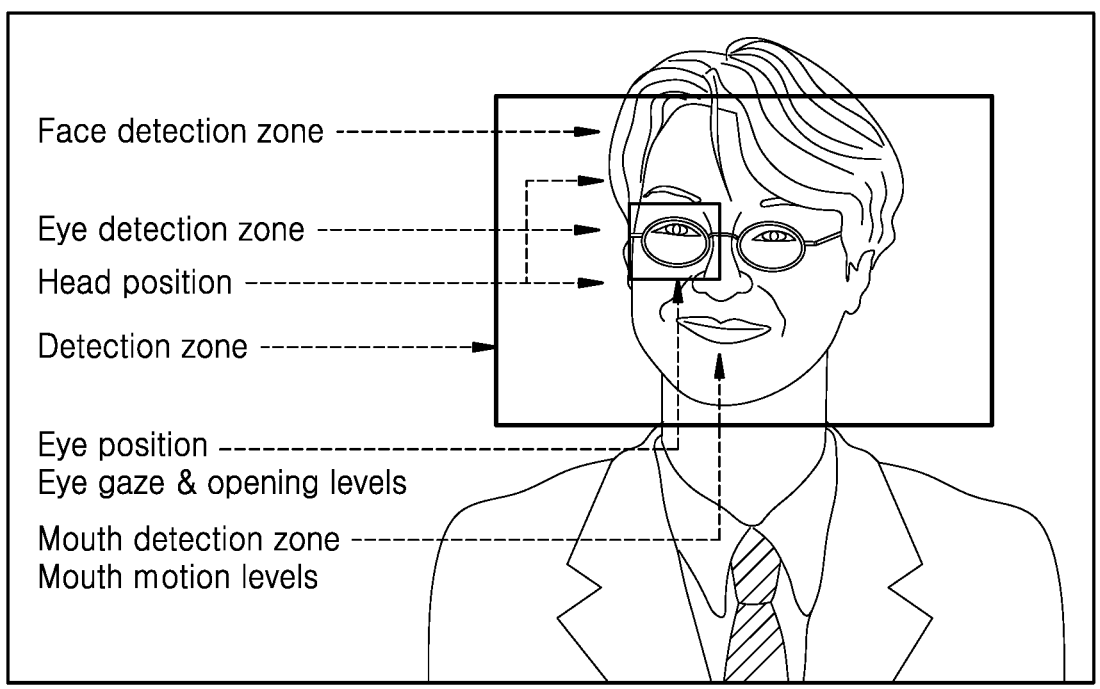
Figure 3:
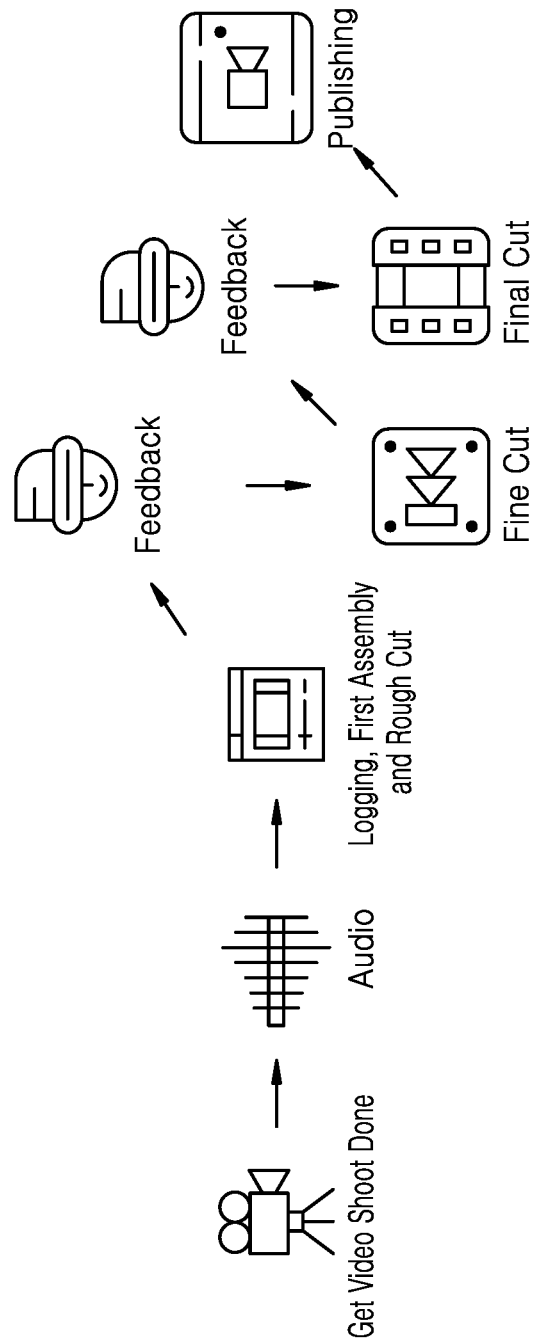
FIG. 3 illustrates related technique for video filtering.

FIGS. 2A and 2B show a related technique such as augmented reality (AR) service, AR zone, which generates personalized media. The AR Zone makes an avatar of a user and generates media for the user. The avatar is generated by taking a picture of user and assigning best matching features from a set of features to the avatar. The media is generated from a set of pre-existing styles where avatar is changed. FIG. 3 illustrates a related technique such as a video filter. The video filter detects a face and a change in facial features of the user. Based on the detected change in the facial features, the user needs to select a filter to be applied.

Figure 4A:
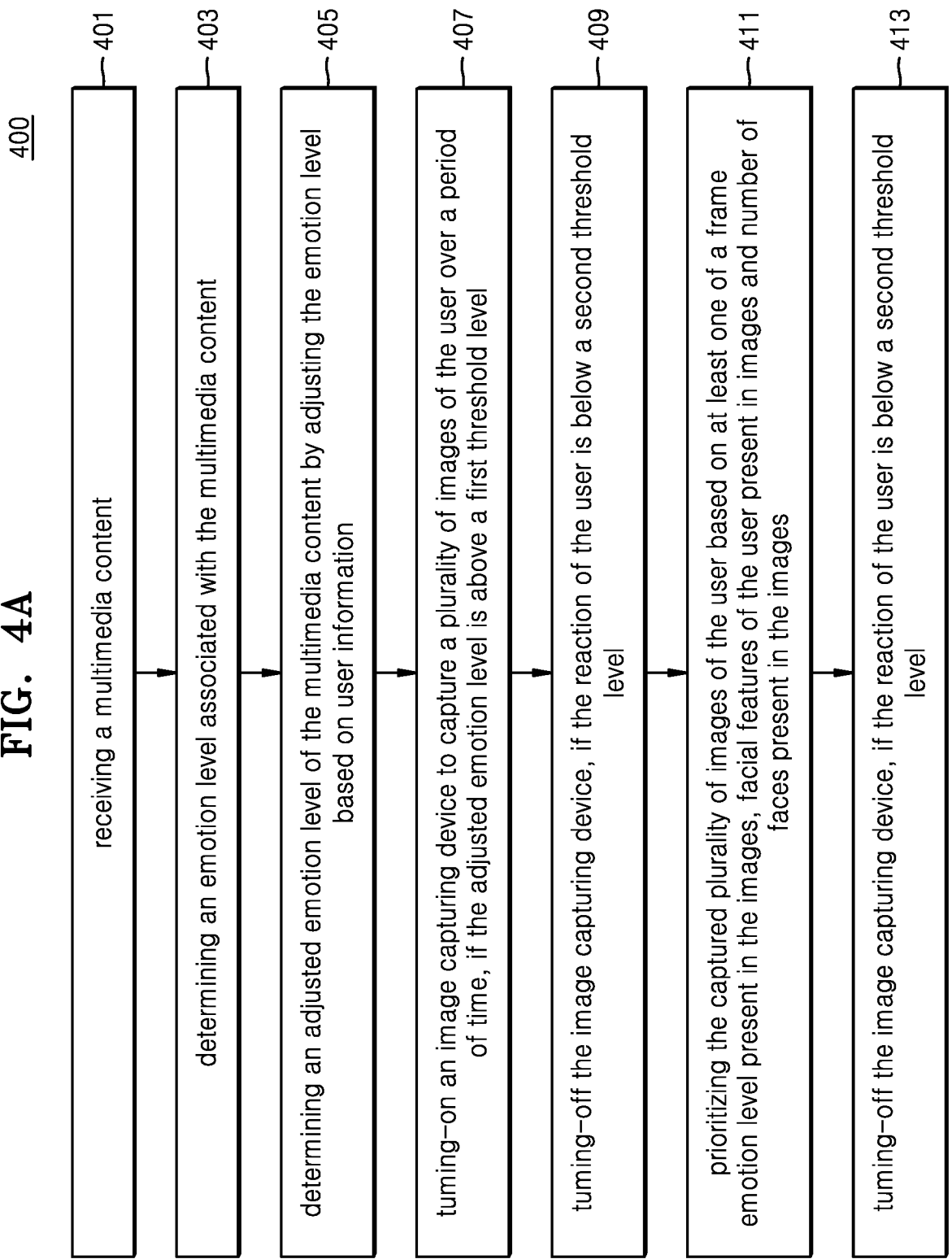
FIG. 4A illustrates a flow chart of a method for automatically capturing and processing an image of a user, in accordance with an example embodiment of the disclosure.

FIG. 4A illustrates a flow chart of a method for automatically capturing and processing an image of a user, in accordance with an example embodiment of the disclosure.

In an example embodiment according to FIG. 4A, a method for automatically capturing and processing an image of a user is provided.

The method 400 comprises receiving a multimedia content at operation 401. The multimedia content may be an audio and video content, text content, audio content and/or video content. As an example, the multimedia content may be a content being watched by a user, or a recording of a user, a live video of a user, etc.

Figure 5A:
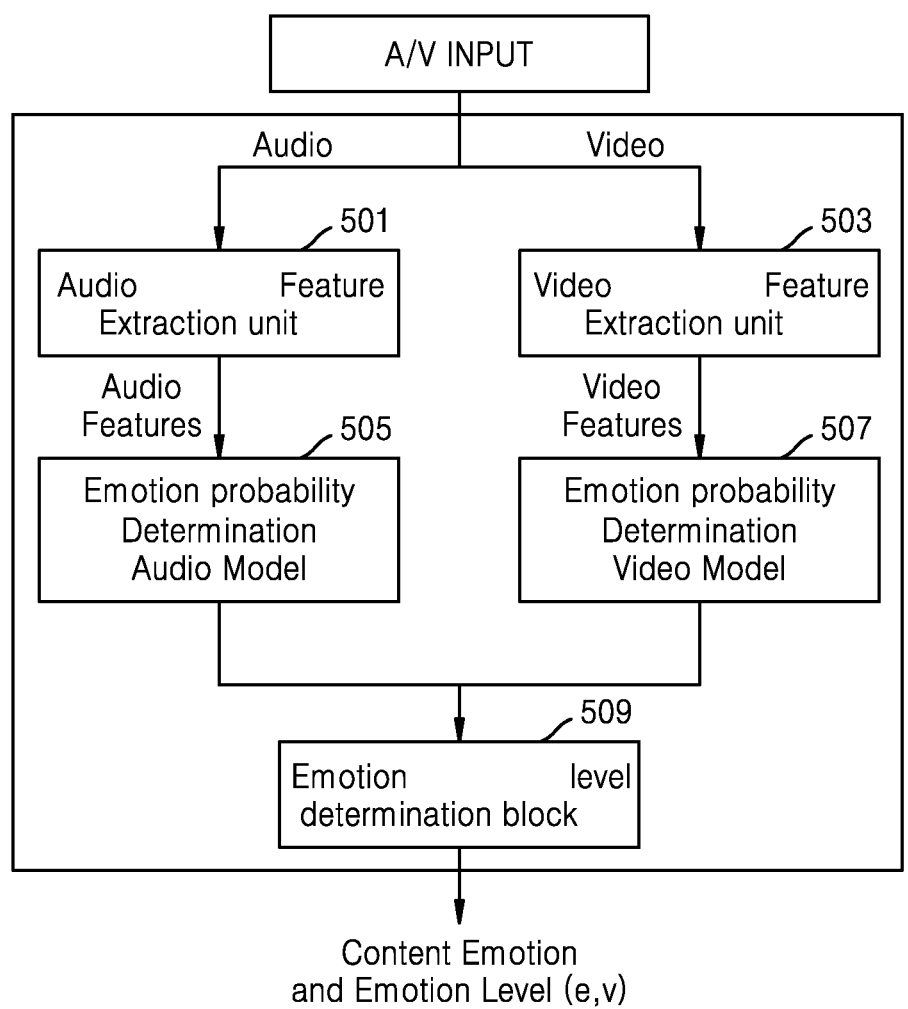
FIGS. 5A and 5B illustrate an example of a content level determination mechanism, in accordance with an example embodiment of the disclosure.
Figure 5B:
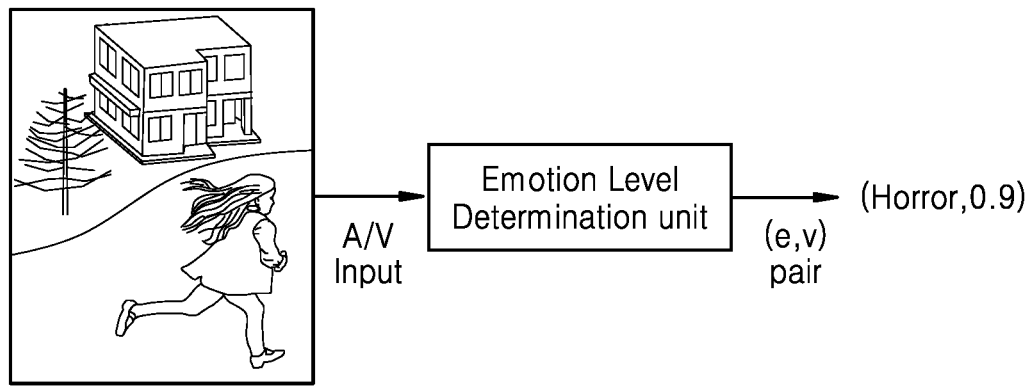

Then, at operation 403, the method 400 comprises determining an emotion level associated with the multimedia content. In an embodiment, emotion may be defined as a feeling contained (or expressed) in the multimedia content and the emotion level may be defined as a degree (or extremeness) of that feeling. In an embodiment, the emotion level may be determined by determining an emotion probability value based on an emotion identified from the multimedia content, using a pre-configured determination model, and determining the emotion level based on the emotion probability value. An example embodiment of determination of the emotion level is described in FIGS. 5A and 5B In an example embodiment, the multimedia content is an audio/video (A/V) input. As shown in FIG. 5A, the A/V input is provided to an audio features extraction unit (501) and to a video features extraction unit (503). The audio features extraction unit (501) determines audio features such as a basic frequency, a time variation characteristic of a fundamental frequency, a root mean square (RMS) value of an amplitude, a voice speed, etc. The video features extraction unit (503) determines video features such as a shot length, a color histogram, a temporal variation characteristic of the color histogram, and a motion vector from a video signal data, facial expression, etc. Based on the determined audio and video features, emotions such as happy, horror, sad, surprise, anger, disgust, fear etc. are identified from the content. Then, the extracted audio and video features are respectively provided to emotion probability determination audio and video models (505, 507) to determine an emotion probability value. In an embodiment, the emotion probability determination may include one or more statistical models, e.g., a Hidden Markov model, that are pre-configured using learning audio and video signal data. It should be noted that any other known model(s) may be used to determine the emotion probability value. Based on the emotion probability value, an emotion level (e, v) of the content may be determined by an emotion level determination block (509). The emotion probability value may be a value indicating the likelihood of the content including certain emotion. For example, as shown in FIG. 5B, when an input content that contains (or is likely to cause) horror emotion is provided to an emotion level determination unit (501b), the emotion is determined as "horror" and the emotion level of the content as 0.9. In an embodiment, the emotion level may vary between 0<v<1, where 0 is moderate and 1 is extreme.

It should be noted that for other types of multimedia content such as text content, known techniques in the art may be used to identify the emotion from the content and determine the emotion level of the content.

Figure 6A:
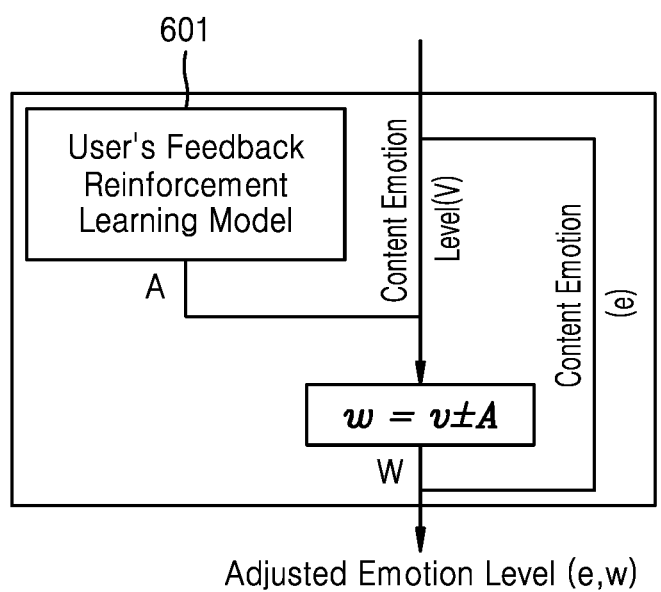
FIGS. 6A and 6B illustrate a mechanism for adjusting content level, in accordance with example embodiments of the disclosure.

At operation 405, the determined emotion level is adjusted based on user information to determine an adjusted emotion level of the multimedia content. In an embodiment, the user information may include at least one of demographic data of the user, a past usage history of the user, and past sensor biological data. In an embodiment, the adjusted emotion level may be determined by determining an adjustment factor for the emotion based on the user information and determining the adjusted emotion level using the adjustment factor. An example embodiment of determination of the adjusted emotion level is described in FIGS. 6A and 6B The content's emotion level is a raw quantity of emotion probability. There may not be a direct relation between the content emotion probability and the emotion that is felt by the user when watching that content. The same content may cause an extreme emotion for one user but may cause moderate emotion for another user, depending on the user's disposition. Hence, the emotion level needs to be adjusted based on user information. To take into account the above-mentioned factors, the following relation may be established between an adjusted emotion level (w) and the content emotion level (v).

$w=v \pm A$, where $A>0$, is a small positive constant

*50A is an adjustment factor for the emotion level, which may be determined using user's information such as an age, a gender and a past usage pattern. For every emotion, it may be calculated using a basic Reinforcement Q Learning model as follows.

$Acur=Aprev+a^\delta$

Figure 6B:
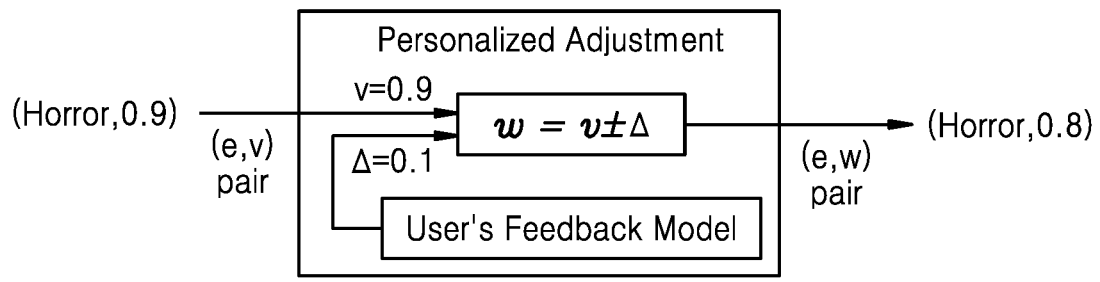

Acur is a current value of the adjustment factor to be calculated, Aprev is a previous value of the adjustment factor, a is a gain factor (e.g., typically 0.8) and δ is an expected error, which may be calculated using a maximizing reward-action type Q learning model. It should be noted that the above discussed model is only an example model of updating the adjustment factor. Any other known models may be used to determine the adjustment factor. Based on the adjustment factor A, the adjusted emotion level of the content may be determined. For example, as shown in FIG. 6B, when emotion level of 0.9 for emotion horror is adjusted based on user information of a particular user, the adjusted emotion level is determined as 0.8 for emotion horror for that particular user.

After determining the adjusted emotion level, at operation 407, the method 400 turns-on an image capturing device to capture a plurality of images of the user over a period of time, if the adjusted emotion level is above a first threshold level. In an embodiment, the plurality of images depicts reaction of the user to the multimedia content. In an embodiment, the first threshold is a minimum expression intensity to recognize static and dynamic facial expressions of the emotion. However, the method 400 comprises turning-off the image capturing device if the reaction of the user is below a second threshold level, at operation 409.

In an embodiment, the image capturing device may be a camera of a wireless and/or wired device such as a mobile device, a television, a laptop, etc. An example embodiment of automatically controlling the image capturing unit (or image capturing device), e.g., a camera, is illustrated in FIGS. 7A-7G, it should be noted here that the term "image capturing unit" and "camera" are interchangeably used throughout the description and in the drawings.

Figure 7A:
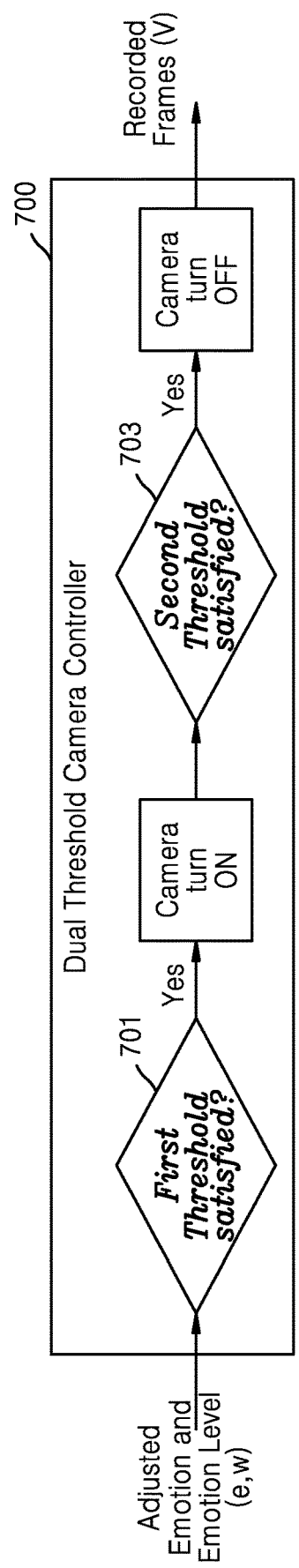
FIGS. 7A-7G illustrate various stages for automatically controlling image capturing unit, in accordance with example embodiments of the disclosure.
Figure 7B:
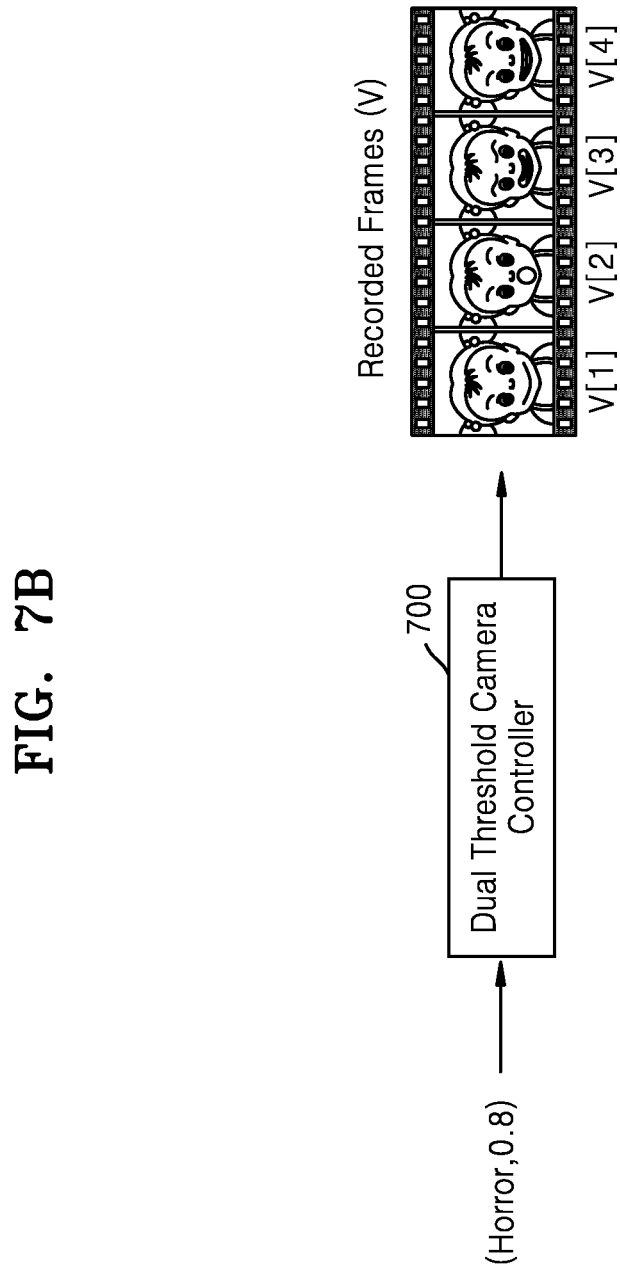

In an embodiment, the disclosure automatically records meaningful moments when a user has reaction to the content by using a two level threshold. As shown in FIG. 7A, it is determined if a first threshold is satisfied (701). If yes, then the camera is turned ON. The determination is made based on an emotion level of the content. Then, it is determined if a second threshold is satisfied (703). If yes, then the camera is turned OFF. The determination is made based on a user's movement. In an embodiment, a dual threshold camera controller (700) automatically turns on and turns off the camera to record frames, i.e., video and/or images of the user within a field view (e.g., in front) of the camera while watching a horror content. The frames of the user are recorded between camera ON and OFF times. As it may be seen from FIG. 7B, the output of the dual threshold camera controller (700) is recorded frames of the user that capture true emotions of the user while watching the content.

Figure 7C:
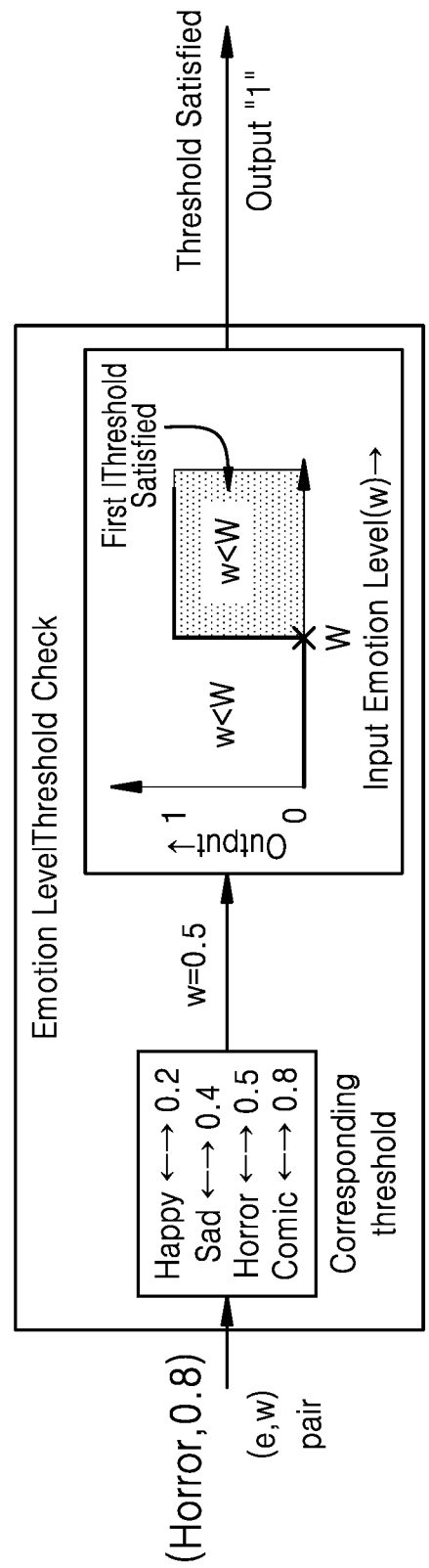

FIG. 7C illustrates a mechanism to determine a first threshold and check if the emotion level of the multimedia content satisfies the first threshold. In an embodiment, the first threshold may be determined by identifying an emotion in the multimedia content. For example, it may be identified that the emotion in the content is "horror". After identifying the emotion, the first threshold may be determined by retrieving a value corresponding to the identified emotion from an emotion threshold table. In an example, it is assumed that there are a total of K predetermined emotions categories including $E_1, E_2, \ldots E_k$ (e.g., happy sad, horror, comic, etc.) and a map is maintained as $<E_i, W_i>$, where $E_i$ is an $i^{th}$ emotion category, $W_i$ is a corresponding threshold of $E_i$ as shown below, and $W_i$ is a constant, $0<W_i<1$:

$E_1 <-> W_1$
$E_2 <-> W_2$
$E_3 <-> W_3$
$E_4 <-> W_4$

In an embodiment, $W_i$ is a fixed predetermined weight assigned to each emotion $E_i$ The value of $W_i$ may be determined from databases known in the art.

An example of the emotion threshold table is shown below:

TABLE 1

| Emotion | Emotion Threshold |
|---|---|
| Happiness | 0.2 |
| Sad | 0.4 |
| Surprise | 0.4 |
| Anger | 0.4 |
| Disgust | 0.4 |
| Fear | 0.5 |
| Horror | 0.5 |

In an embodiment, the given thresholds may be based on a recognition database created based on static and dynamic expression changes, which are obtained using photos or short videos (e.g., of one second) of humans exposed to varied degree of expressions such as happiness, sad, surprise, etc. The emotion threshold, i.e., first threshold may be defined as the minimum expressive intensity that is required to recognize static and dynamic facial expressions of emotion, such as happiness, sadness, anger, disgust, fear, and surprise.

After identifying the emotion e, the corresponding first threshold W for the input emotion e is retrieved from the emotion threshold table $<e, W>$ such that, $e \in \{E_1, E_2, \ldots, E_k\}$ and W is the corresponding first threshold of e.

Based on the example emotion threshold table shown above, for input emotion e as "Horror", a corresponding predetermined threshold may be determined as W=0.5

Figure 7D:
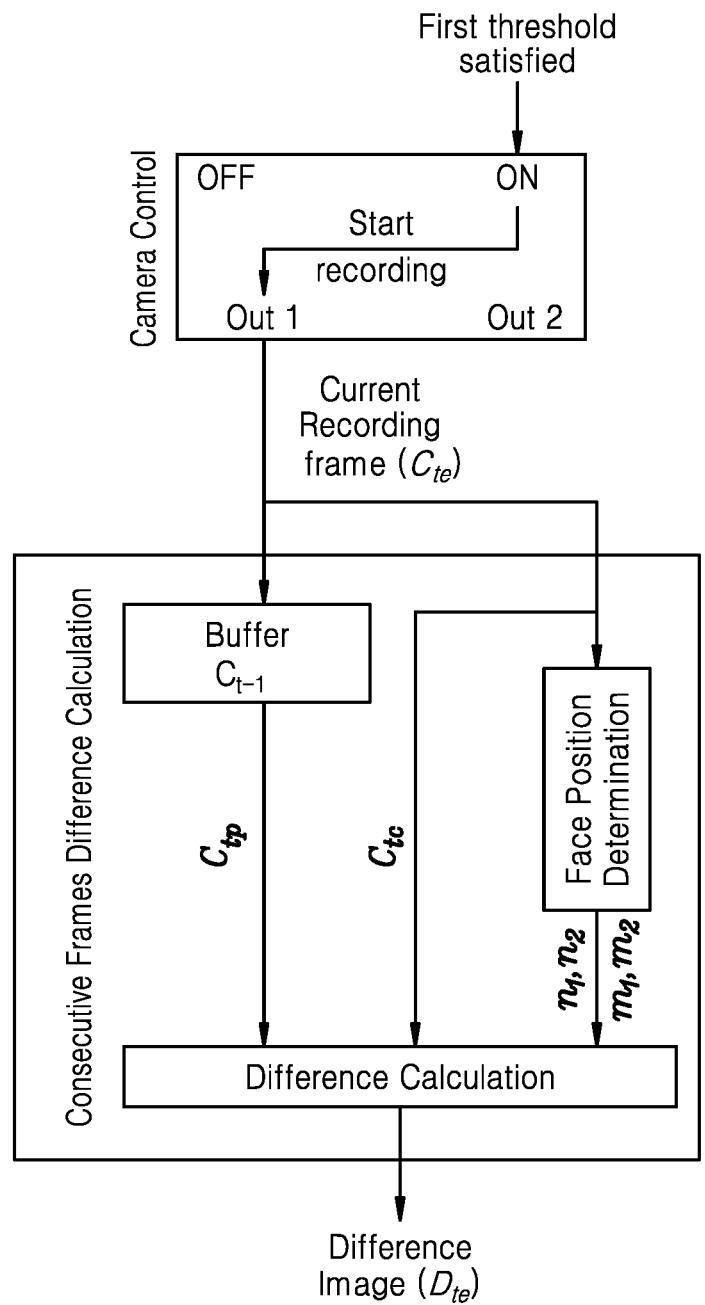

After determining the first threshold, the adjusted emotion level (w) is compared with the first threshold (W) based on a threshold function, as shown below, First threshold is satisfied when w>W
First threshold is not satisfied when w≤W As shown in FIG. 7C, when an input of adjusted emption level of 0.8 is mapped with the first threshold corresponding to the emotion "Horror" in the emotion threshold table, it is determined that the adjusted emotion level is greater than the first threshold. Accordingly, it is determined that the first threshold is satisfied. After determining that the first threshold is satisfied, the camera is automatically turned ON, as shown in FIG. 7D. However, if the first threshold is not satisfied, then the method 400 does not proceed further. As shown in FIG. 7D, after turning the camera ON, a current recording frame $Ct_c$ is obtained as an output from the camera (shown as "Out 1" in the figure).

Figure 7E:
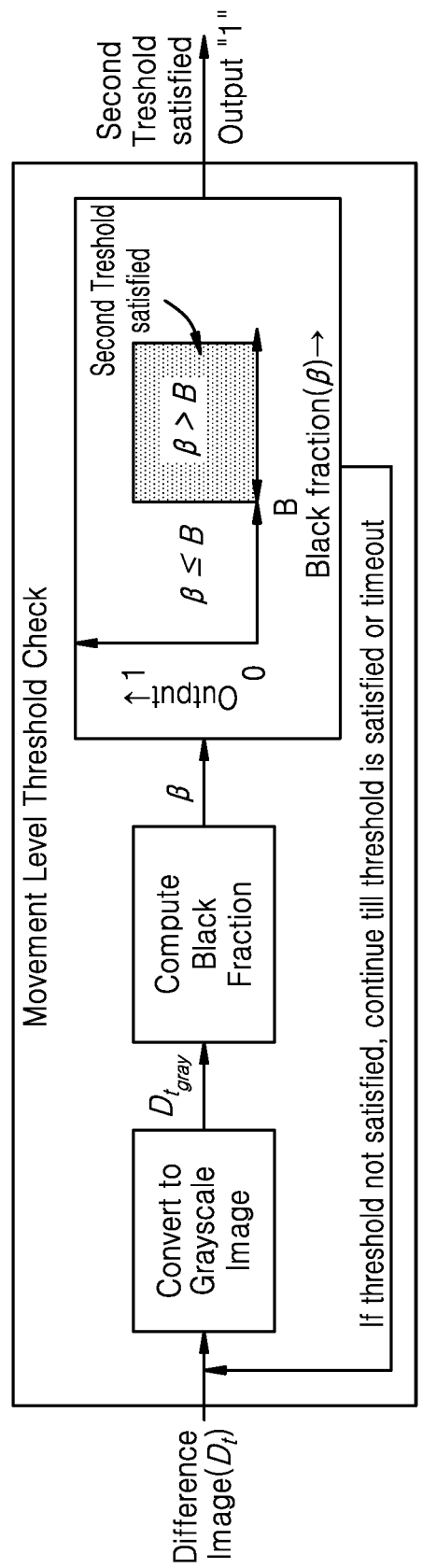
Figure 7F:
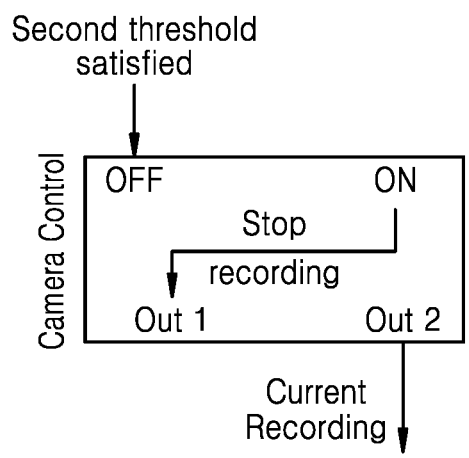

FIGS. 7D-7F illustrate a mechanism to determine the second threshold and check if the reaction of the user is below the second threshold. In an embodiment, the second threshold is determined by determining a change detected corresponding to a position of the user in a current image with respect to a position of the user a previous image. For example, the second threshold is determined by first determining a face position of the user in the current image and the previous image and determining a difference in the user's reaction to the content in the current image and the previous image based on the determined face position. The current image and the previous image are received from the image capturing device, e.g., camera. Thereafter, the second threshold is determined by determining a difference in consecutive images based on the change in the reaction of the user. As shown in FIG. 7D, when the camera is turned ON, the camera records a current frame at current time instance t. In an embodiment, the current recording frame $Ct_c$ may refer to a "single frame recorded by the camera at current time instance, $t_c$"

the current recording frame $Ct_c$ may refer to an N×M array of pixels, where $Ct_c(i, j)$ may represent an RGBA value of a corresponding pixel.

In an embodiment, a buffer is maintained for storing a previous recording frame or image $Ct_p$ of the user captured at a previous time instance $t_p$ by the camera. The relation between $t_c$ and $t_p$ will be explained later.

After capturing the current and previous images of the user, a change in the user's reaction is determined. In particular, the position of user's face is determined in the N×M pixels. In an embodiment, this may be done by using a known existing technique such as, e.g., a deep neural network (DNN) Face Detector, which is a widely used face detection technique. It is assumed that when a user's face lies within the pixel array of $i=n_1$ to $i=n_2$ and $j=m_1$ to $j=m_2$ in the consecutive images $C_{tc}$ and $C_{tp}$, then the output of the face position determination is $n_1$, $n_2$, $m_1$, $m_2$, i.e., the starting and ending pixel position pairs of the user face. It may be noted that the face position determination may be an optional operation to improve the processing speed of the method of the disclosure. That is, the face position determination may be used to reduce an amount of processing required for determining the change in the user's reaction by limiting the pixel area to be processed, instead of processing an entire area of the current image and the previous image.

Thereafter, a difference in consecutive images $C_{tc}$ and $C_{tp}$ is determined as follows:

for ($i=n_1$ to $i=n_2$)

for ($j=m_1$ to $j=m_2$)

$$D_t(i,j)=C_{tc}(i,j)-C_{tp}(i,j)$$

$D_t$ is a difference image which is a difference between consecutive recording frames at a current time instance. In an embodiment, the difference image $D_t$, is a $(n_2-n_1)\times(m_2-m_1)$ array of RGBA pixels containing information about the change in recording frames around the user's face. Thus, the user's movement and/or reaction for the multimedia content accessed by the user is determined.

In an embodiment, the relation between $t_c$ and $t_p$ is defined as follows:

$$t_c=t_p+N_i$$

wherein $N_i$ defines periodicity. In other words, the above equation conveys that "consecutive frames difference calculation" (or calculation of a difference between consecutive frames) is not performed for every frame, but is performed periodically according to periodicity defined as $N_i$. In an embodiment, the value of periodicity $N_i$ may depend upon a probable emotion which is being captured Since a reaction rate of human may be different for different emotion, different periodicity may be used for accuracy. Based on known techniques to recognize facial emotion based on images of individuals showing various emotions, the following may be concluded.

TABLE 2

| Emotion | Ni |
| --- | --- |
| Happiness, Horror | 23-28 ms |
| Neutral, Disgust, Surprise | 70-75 ms |
| Sadness, Anger | 230-280 ms |

It should be noted that any other known method may be used to calculate the periodicity value.

In an embodiment, the difference image $D_t$ may be used to determine the second threshold level. After determining the second threshold value, it is determined if the user's reaction is below the second threshold level. This determination is further explained in FIG. 7E. As shown in FIG. 7E, the difference image $D_t$ is converted into a grayscale image $D_{tgray}$. Thus, $D_{tgray}$ is a $(n_2-n_1)\times(m_2-m_1)$ array of grayscale pixels $D_{tgray}(i, j)$ is a value between 0 to 1, where 0 represents a fully black pixel and 1 represents a fully white pixel. Thereafter, a black fraction β is computed. The black fraction β is a measure of an amount of a change between the frames that are recorded for the user. A higher value of the black fraction β indicates less or substantially no change. In an embodiment, the black fraction β represents a proportion of an almost black fraction present in the image $D_{tgray}$, i.e., $$\beta = \frac{\text{count}(D_{tgray}(i, j) \text{ such that } 0 \leq D_{tgray}(i, j) \leq \varepsilon)}{(n_2 - n_1) \times (m_2 - m_1)}$$

where 0<ε<0.3 is a small positive constant.

*90After computing the black fraction, the value of the black fraction is compared to determine if the second threshold (B) is satisfied. The value of B needs to be fine-tuned. In an embodiment, B>0.6. If the second threshold (B) is satisfied (i.e., β>B), then the output is 1, i.e, the camera is turned OFF, as shown in FIG. 7F. Otherwise, the previous operations from 401-407 in FIG. 4A are repeated. After turning the camera OFF, the entire recorded video frames between a time point at which the camera was turned ON till a time point at which the camera was turned OFF are obtained as an output from the camera (shown as "Out 2" in the FIG. 7F).

Figure 7G:
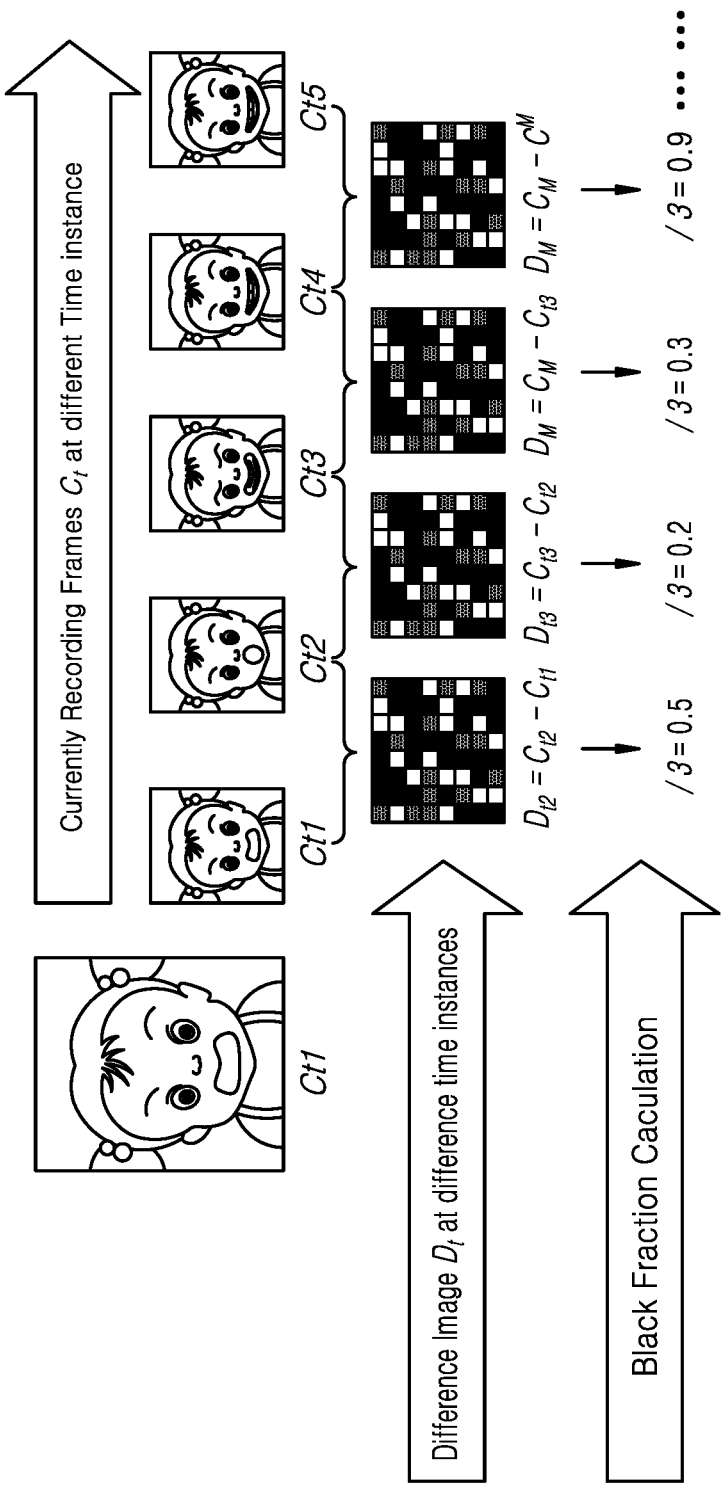

The output of the dual threshold camera controller is the "Recorded Video Frames (V)" which is generated after turning the camera OFF, as shown in FIG. 7G. V may be seen as an array of multiple frames, and may be defined as follows:

V[i] is the $i^{th}$ recorded frame; V[i] is a N×M array of RGBA pixels

After capturing a plurality of images of the user from the camera, the method, at operation 411, prioritizes the captured plurality of images of the user based on at least one of a frame emotion level present in the images, facial features of the user present in images and a number of faces present in the images. In an embodiment, the plurality of the images are prioritized by categorizing the plurality of images into sets of frames, wherein each set of frames comprises images of the user for predefined emotion categories. Thereafter, the frame emotion level is calculated from images present in each set of frames. Then, a priority value is generated by applying a predetermined function to the calculated frame emotion level in each set of frames. In an embodiment, the predetermined function may include weighted summation of the frame emotion level of each set of frames, determination of a number of faces in each of frames, and determination of a facial priority value. Based on the priority value, the images in each set of frames are prioritized.

FIGS. 8A-8M illustrate various stages for prioritizing a plurality of images of a user in detail, in accordance with an embodiment of the disclosure. In an embodiment, a prioritization unit (800) may prioritize the captured plurality of images of the user. In an embodiment, the prioritization unit (800) may refine the received recorded frames, select frames for media generation based on an emotion level of each frame and prioritize the frames for a predefined emotion category separately by using following operations:

Determine the emotion level of each frame and map an emotion threshold for each emotion category Select the frames that satisfy the threshold and make a duplicate for continuous (e.g., three or more) frames.

Generate a priority value based on SNF maximizing factors, which will be described in detail later.

Generate an array of prioritized frames for each emotion category for media generation.

Figure 8A:
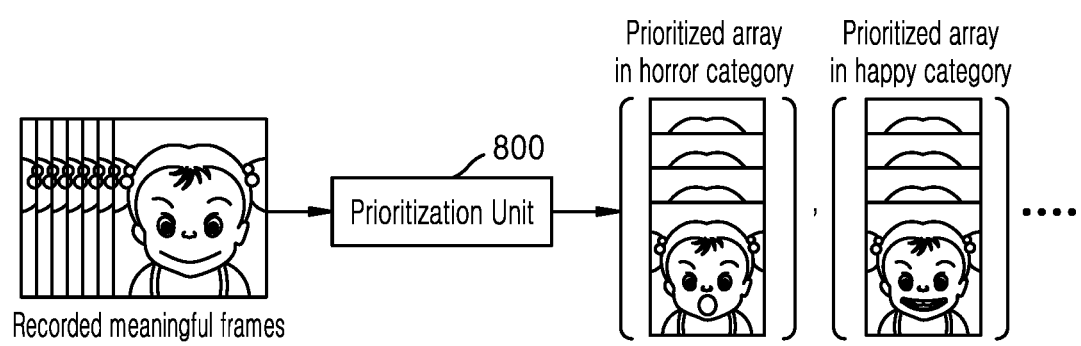
FIGS. 8A-8M illustrates various stages for prioritizing plurality of images of a user, in accordance with example embodiments of the disclosure.

In an embodiment, the input to the prioritization is a recorded video frames array (V), where V[i] is an $i^{th}$ recorded frame and V[i] is an N×M array of RGBA pixels, and the output is a prioritized array of frame(s) for each predefined emotion category, as shown in FIG. 8A. The prioritization of the frames is explained in detail with reference FIGS. 8B-8M.

Figure 8B:
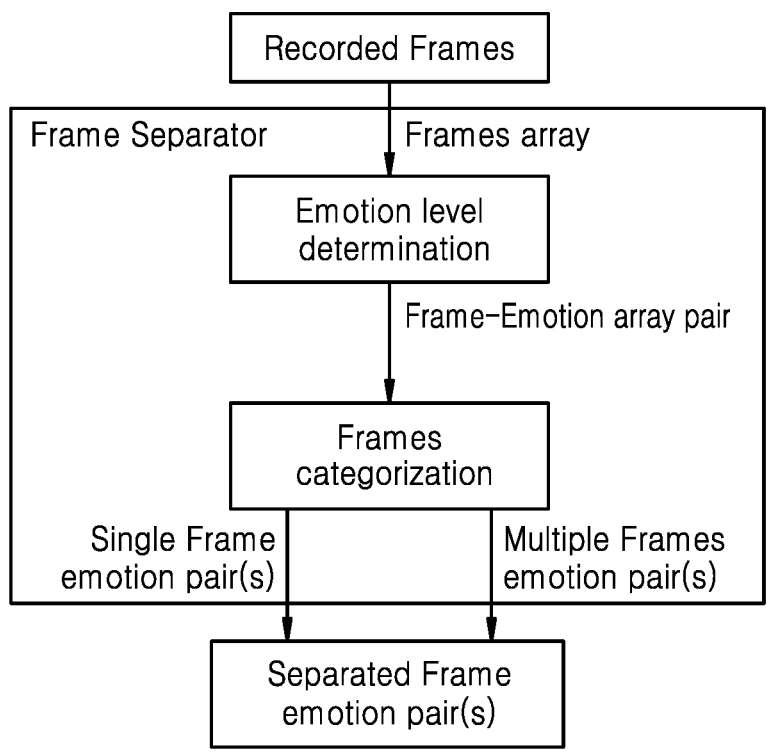
Figure 8C:
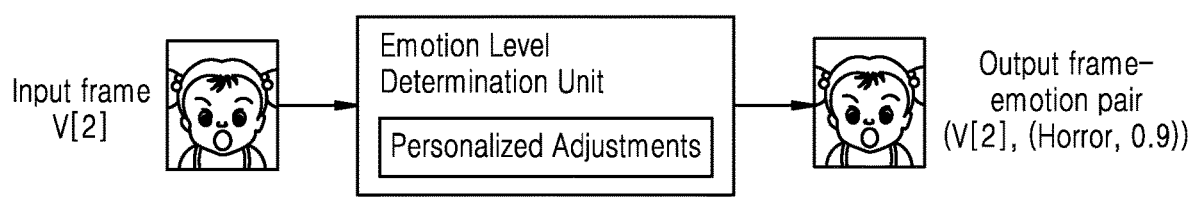
Figure 8D:
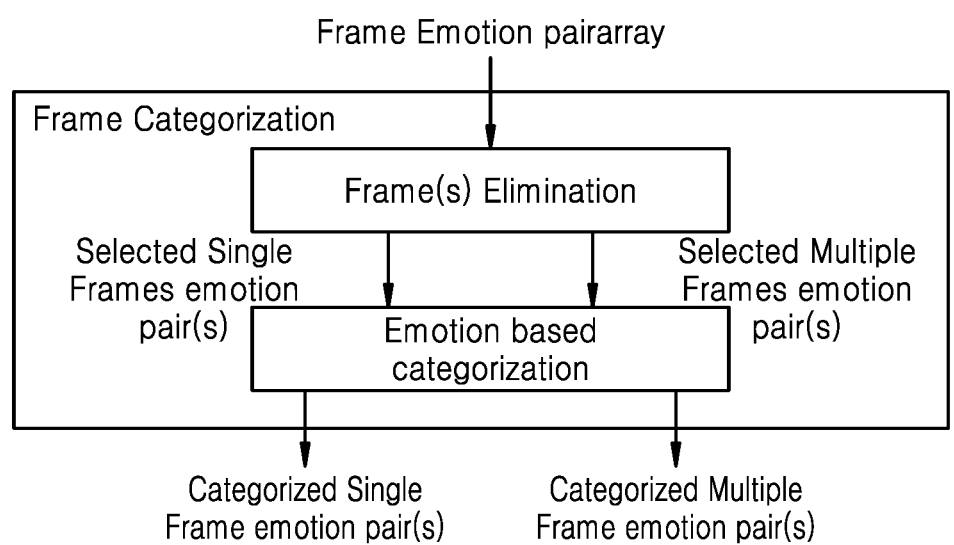

Firstly, as shown in FIG. 8B, a frame separator (801*b*) may categorize the captured images of the user into sets of frames. The sets of the frames may comprise images of users for predefined emotion categories. For example, one set of frame may comprise user images for "happy" emotion, whereas another set of frames may comprise user images for "sad" emotion. Thereafter, the array of frames are passed as an input where a frame emotion level is determined for each set of frames and adjusted for each of the frames. The frame emotion level may be adjusted in the same manner as described above in reference to FIGS. 6A-6B. Then, facial features of the user are captured in the frame and later processed using a support-vector machine (SVM) model to identify a dominant emotion in the frame. For example, for the input array V where V[i] is the $i^{th}$ recorded frame, and is a N×M array of RGBA pixels, for each frame V[i]->Emotion level determination->Fram-Emotion pair (V[i],E'[i])

Where, E'[i] is an emotion-value pair (e', v') where e' corresponds to the dominant emotion and v' corresponds to its level for the frame V[i].

Thereafter, the emotion-value pair is adjusted based on user information to achieve a more accurate emotion level for user. The adjusted emotion level w' may be calculated as w'=v'±Δ where v' is the frame emotion level and Δ>0, is a small positive constant. The value of Δ may be determined using user information such as an age, a gender and a past usage pattern. In an embodiment, the value of Δ may be determined using a reinforcement learning model. It should be noted that any other known technique may be used to calculate the value of Δ. FIG. 8B illustrates an output after determining the frame emotion level.

In an embodiment, the frame emotion level may be determined as the emotion level of the images in the frame if the set of frame includes a single frame. However, if the set of frame include multiple frames, the frame emotion level may be determined as weighted sum of the emotion values of all frames.

The frames are further categorized based on a) single/multiple frame emotion pair(s), b) a type of emotion. As shown in FIG. 8), the frames which do not depict a sufficient emotion value are eliminated. This elimination may be performed in two steps.

The threshold value W$_i$' or the frames is calculated based on the type of emotion. These thresholds may be mapped, using any known database which provide thresholds for static and dynamic emotion faces. The values may be further normalized before being used. e.g., −(e', w')=(happy, 0.2). An example of the mapping is provided below.

E1'<->W1'
E2'<->W2'
E3'<->W3'
E4'<->W4'

Each emotion category Ei' will be assigned a threshold Wi'. Wi' is a constant, s.t, 0<Wi'<1.

If the set of frame has a single frame, then, for any emotion-value frame (V[i], (e', w')) for e $E_k$' if the value w'<W$_k$' then the frame is marked invalid.

If the set of frame has multiple frames, then the frames are further processed to make a copy of any three or more continuous valid frames.

Figure 8E:
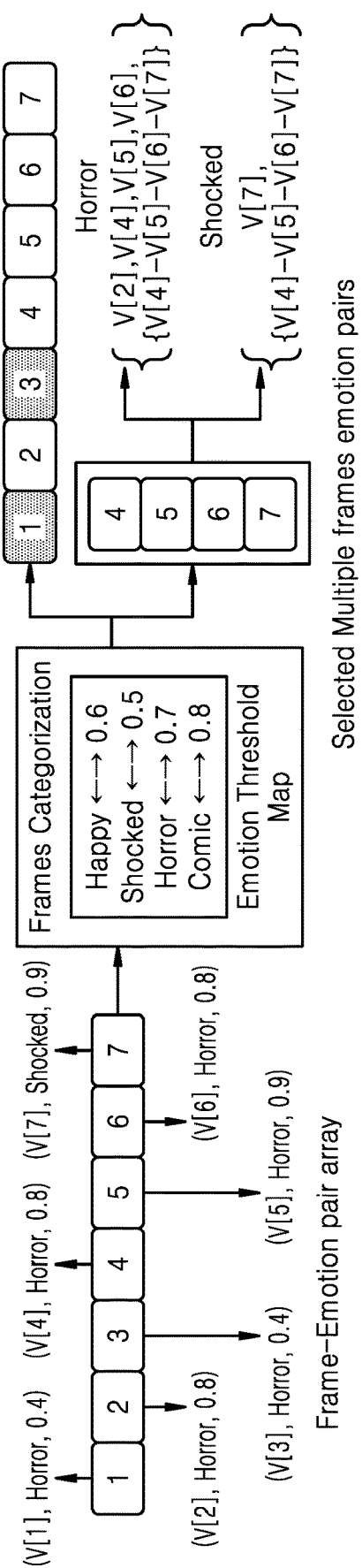

Among all the selected single/multiple frames, each frame is categorized in its predefined emotion category. The continuous frame emotion pair(s) are categorized into all the emotion displayed in the frames and a copy is maintained for each category, as shown in FIG. 8E.

Figure 8F:
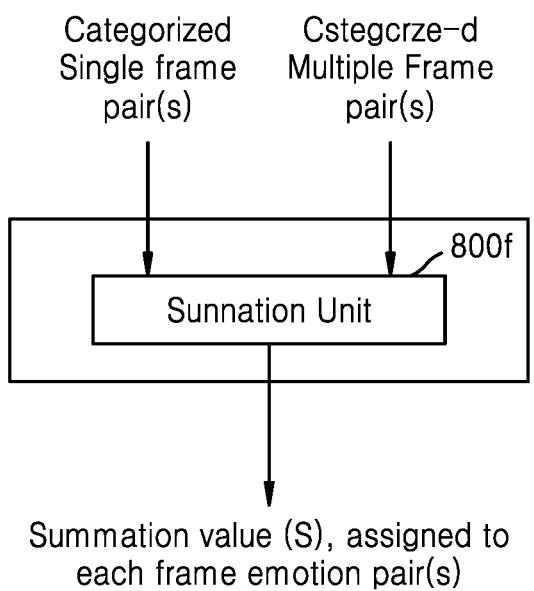

Thereafter, a priority value is generated by applying a predetermined function to the calculated frame emotion level in each set of frames. In an embodiment, the predetermined function may include weighted summation of the frame emotion level of each set of frames, determination of number of faces in each of frames, and determination of a facial priority value. FIG. 8F illustrates an example embodiment of the weighted summation of the frame emotion level. As shown in FIG. 8F, a summation unit (880*f*) may be used to calculate the weighted summation. The summation unit (800*f*) maps each selected frame emotion pair(s) to a summation value based on their frame emotion level. In an embodiment, a summation value (S) is assigned to each frame emotion pair(s). The summation value for a single frame emotion pair is the frame emotion level of that frame itself. The summation value for a multiple frame emotion pair is the weighted sum of emotion level of all the frame emotion pair(s), divided by the total number of pairs as shown below:

$$\text{Summation value } (S) = \begin{cases} = w', \text{ where } w' \text{ is the adjusted emotion level of frame;} & \text{Single frame emotion pair} \\ = \dfrac{\sum_k^{i=categorized\ emotion} w'_i + 0.5 \sum_k^{i=non-categorized\ emotion} w'_i}{(\text{Total number of frames})} & \text{Multiple frame emotion pair} \end{cases}$$

Figure 8G:
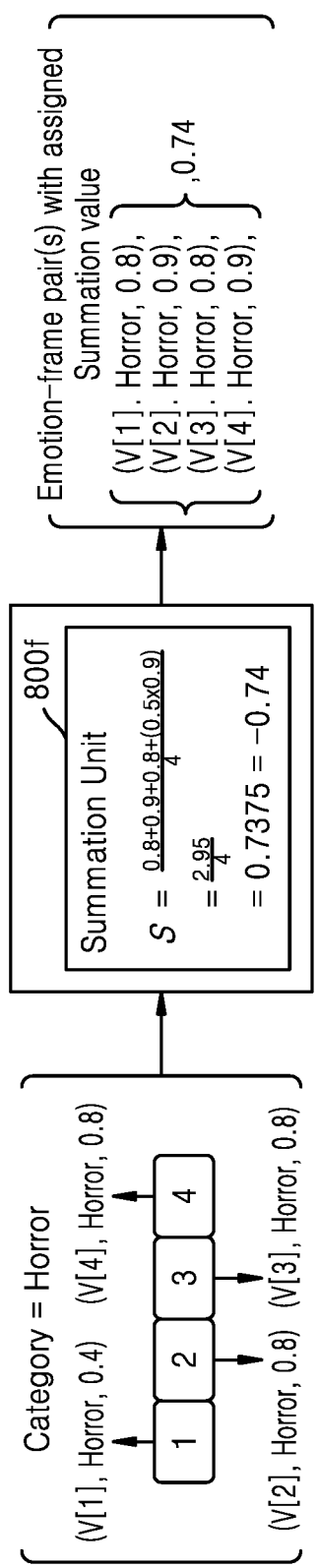

FIG. 8G illustrates an example summation value for a given input of multiple frame emotion pairs V[1] to V[4].

Figure 8H:
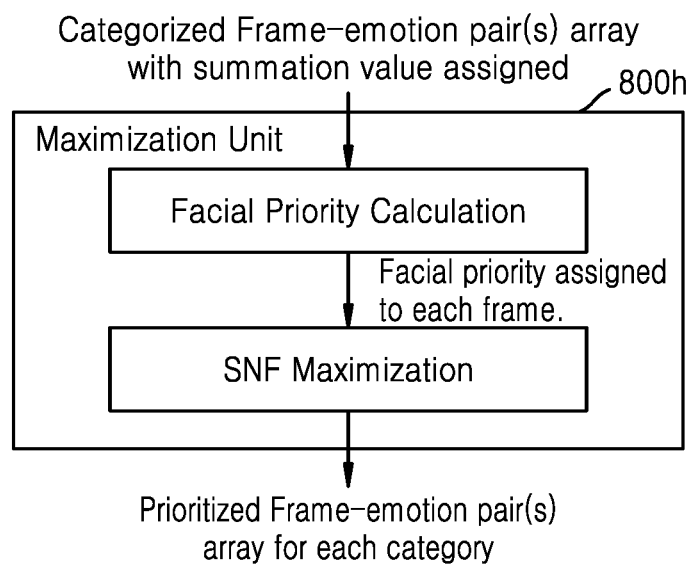

Determination of a facial priority value is described with reference to FIG. 8H. As shown in FIG. 8H, a maximization unit (800*h*) may be used to calculate the facial priority value. In an embodiment, the facial priority value (F) may be determined by determining presence of predefined facial features in the images of each set of frame, wherein the predefined facial features are assigned a predetermined weight and determining the facial priority value based on the presence of the predefined facial features and the predetermined weight. In particular, the facial priority value may be determined based on presence of certain facial features in the concerned frame(s). For example, each emotion category has a list of facial features 'r' s.t. $r_i[j]$ denotes a $j^{th}$ feature in an $i^{th}$ emotion category. A predetermined weight 't' is assigned to these features s.t. $t_i[j]$ denotes the weight of the $j^{th}$ feature in the $i^{th}$ emotion category. In an embodiment, the relative priority of weights may be determined by using existing techniques such as techniques for multiple emotional classification of facial expressions. In an embodiment, the relative priority between facial features for six basic emotions may be provided, e.g., (Happiness–raised cheek=1, mouth corners pulled up=2).

Figure 8I:
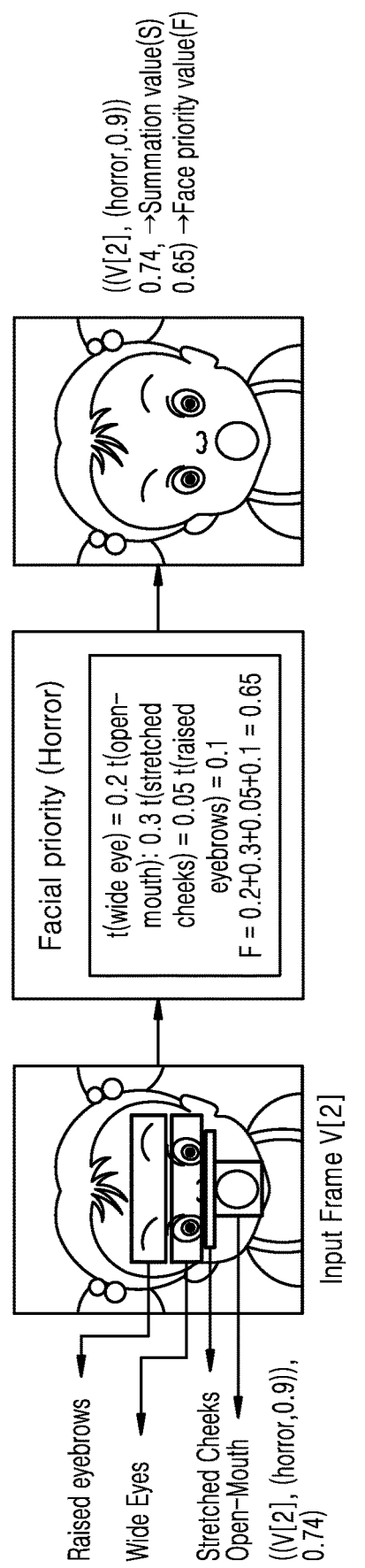

These weights are further normalized such that $\sum_{j=1}^{n} t_i[j] = 1$ for any given emotion catergory The facial priority for frame $V[i]$ belonging to the $k^{th}$ emotion catergory can be calculated as follows:

The facial priority ($F$) for frame $V[i]$ in $k^{th}$ emotion catergory $= \sum_{x=1}^{n} r_k[x] \times t_i[x]$ $\begin{pmatrix} r = 0 \text{ if feature is present in frame} \\ r = 1 \text{ if feature is absent in frame} \end{pmatrix}$ Prioritized Frame – emotion pair(s) array for each catergory In the above equation, the Facial Priority value (F) is calculated as the sum of weights of all the facial features that are present in the frame. FIG. 8I illustrates an example facial priority value for a given input of frame V[2] from horror category.

Figure 8J:
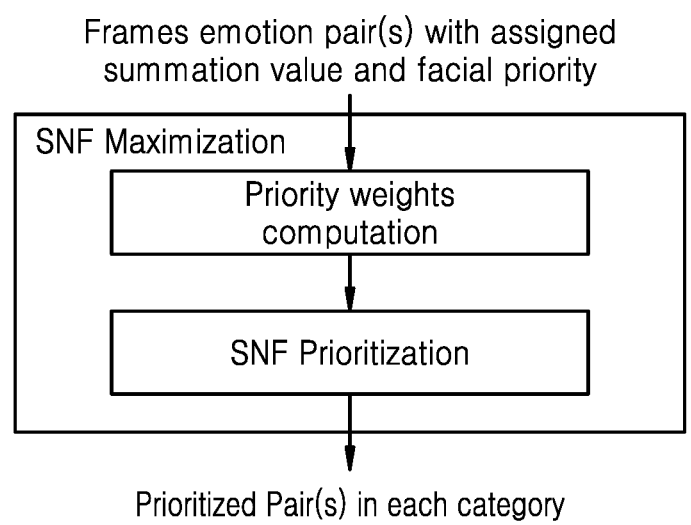

FIG. 8J illustrates generation of the priority value. As shown in FIG. 8J, the priority value be generated based on a predetermined function. In an embodiment, the predetermined function may be a SNF function, i.e., weighted summation value of frame emotion levels (S), a number of faces in the frame emotion pair(s) (N), and the facial priority value (F). Each of S, N and F is given a predetermined weight $s_k$, $n_k$ and $f_k$ respectively, where k is the category of the emotion. A <emotion, priority factor> map is created based on these weights. The weights may be determined using a basic Gradient Descent model. A basic value for these weights are decided for all emotion such that:

$s_k + n_k + f_k = 1$         1)

$s_k + f_k >= n_k$        2)

$s_k + f_k >= 0.75$        3)

Figure 8K:
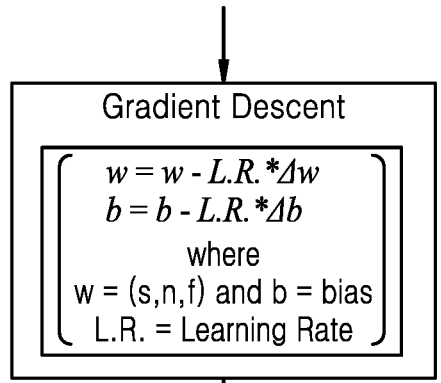

It should be noted that the above equation to calculate the SNF priority value in maximizing unit may be changed depending on the output requirement. These values may be further fine tuned using basic Gradient Descent model for each emotion separately, as shown in FIG. 8K. In an example, sample pictures for emotion recognition may be used to train the model and fine tune these values. These values may also be further tuned from the feedback received, generating a personalized priority weight value for each user. The model used to tune the weights may be changed according to the output required to be generated finally. Thereafter, a prioritization value is calculated based on the priority factors and their weights and a priority value (SNF) is assigned.

Figure 8L:
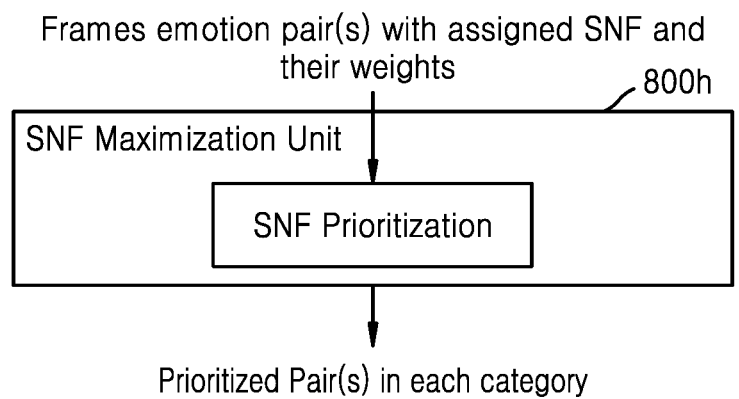

After generating the priority value, the images in each set of frames may be prioritized, as discussed in FIG. 8L. In an embodiment, a SNF maximization unit (800h) may prioritize the images based on the priority value. In an embodiment, frame-emotion pair(s) are ordered based on their priority value. In an embodiment, the below emotion-priority factors map may be used.

Emotion-Priority Factors Map $E1' <-> (s1, n1, f1)$ $E2' <-> (s2, n2, f2)$

. . .

$Ek' <-> (sk, nk, fk)$

The pair(s) in each category are prioritized separately, which results in separate prioritized frames for each emotion category. The SNF priority calculation based on s, n, f weights is not limited and may be changed according to the required output. An example of priority calculation from the recorded frames is provided below.

For any frame V[i] belonging to a $k^{th}$ emotion category, the SNF priority may be calculated as follows.

Priority Value (SNF) for frame of category $k = S*s_k + (1-N)*n_k + F*f_k$

Figure 8M:
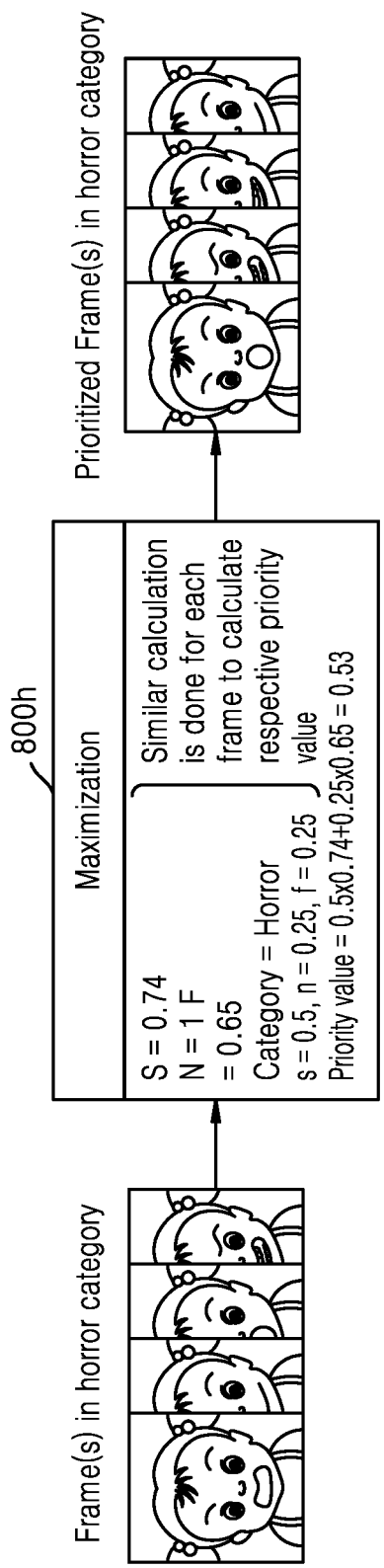

FIG. 8M shows prioritized images in horror category for a given input of multiple frame emotion pairs V[1] to V[4].

After prioritizing the plurality of images of the user, the method 400, at operation 413, processes the prioritized images to generate an output. In an embodiment, a processing unit may perform various actions based on the output requirement. Some of the processes that may be performed in this block are as follows, which are explained in detail below:

Frame Enhancement
Media Generation
Health index calculation
Video Editing

Frame Enhancement:

The frame(s) received from previous blocks may be enhanced by adjusting the blur, lighting, sharpness and color content in the frame(s). The adjustments and enhancement may be performed using vision API(s) from OpenCV.

Media Generation:

Media may be generated from the frame depending on the output requirement, e.g., —emotion pairs making a simplistic cartoonized version of frame(s), avatar creation using past emotion data, and live avatar creation in a video call mimicking the emotions displayed by the user. It may also be used to create personalized meme template of a user, editing the available meme matching the emotion displayed by the user.

Health Index Calculation:

The frames may be analyzed to calculate the happiness index from the emotions displayed. The frequency of high and low happiness index may also be monitored which may further be used to notify user about any potential risk.

Video Editing:

The video frames recorded in the media may be edited according to user's requirement and past usage. The basic edits such as trimming, zooming, joining or overlay animation may be performed to provide an edited output to the user according to the requirement.

Figure 9:
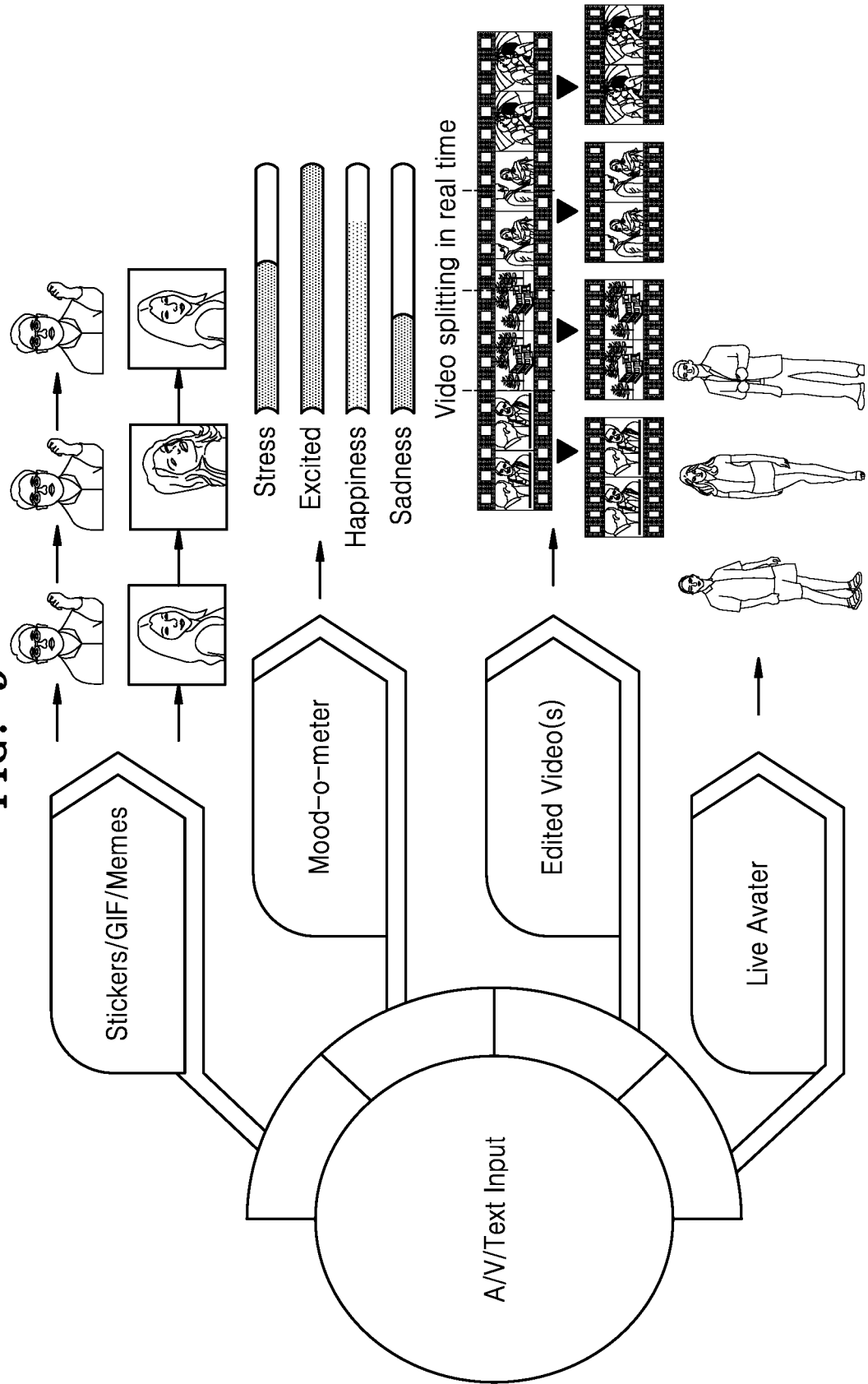
FIG. 9 illustrates various output generated, in accordance with an example embodiment of the disclosure.

After processing the prioritized images, various outputs may be generated, as shown in FIG. 9. For example, stickers/Graphics Interchange Format (GIF)/memes may be generated as output. In an example, a Mood-o-meter to monitor user's mood or health conditions such as a stress level, may be generated as output. In an example, edited videos may be generated as output. In an example, a live avatar created in real time dressed and acting like the user in the recorded frames, may be generated. It should be noted that the above examples are only provided for illustrative purposes as examples of the outputs which may be generated in accordance with the disclosure. However, other forms of output generation may also be possible using the above embodiments of the disclosure and all such generated outputs will fall within the scope of the disclosure.

Figure 10:
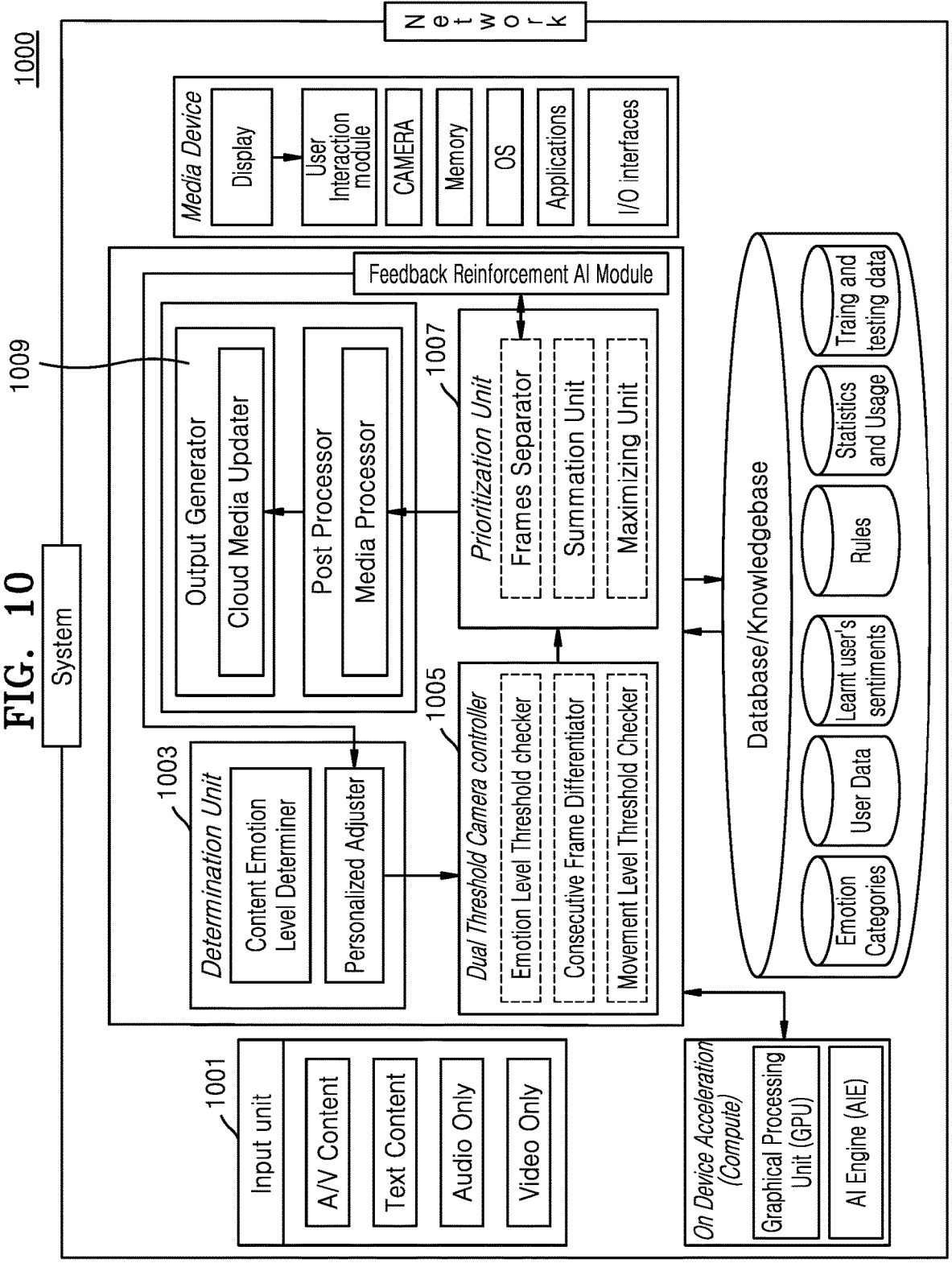
FIG. 10 illustrates a block diagram of a system for automatically capturing and processing an image of a user, in accordance with an example embodiment of the disclosure.

FIG. 10 illustrates a block diagram of a system for automatically capturing and processing an image of a user, in accordance with an example embodiment of the disclosure. As shown in FIG. 10, the system 1000 may comprise an input unit (1001) configured to receive a multimedia content. The system (1000) may also comprise a determination unit (1003) configured to: determine an emotion level associated with the multimedia content and determine an adjusted emotion level of the multimedia content by adjusting the emotion level based on user information. In an embodiment, the determination unit (1003) may comprise a content emotion level determiner, which may operate in accordance with example embodiments of FIGS. 5A and 5B and a personalized adjuster, which may operate in accordance with example embodiments of FIGS. 6A and 6B. The system (1000) may also comprise a dual threshold camera controller (1005) configured to: turn-on an image capturing device to capture a plurality of images of the user over a period of time, if the adjusted emotion level is above a first threshold level, wherein the plurality of images depict reaction of the user to the multimedia content; and turn-off the image capturing device, if the reaction of the user is below a second threshold level. In an embodiment, the dual threshold camera controller (1005) may also comprise an emotion level threshold checker, consecutive frame differentiator and a movement level threshold checker, which may function in accordance with example embodiments of FIGS. 7A-7G. The system (1000) may further comprise a prioritization unit (1007) configured to prioritize the captured plurality of images of the user based on at least one of a frame emotion level present in the images, facial features of the user present in images, and a number of faces present in the images. In an embodiment, the prioritization unit (1007) may comprise a frame separator, a summation unit, and a maximizing unit, which have been described with reference to FIGS. 8A-8M. The system (1000) may also comprise a processing unit (1009) configured to process the prioritized image to generate an output. In an embodiment, the processing unit (1009) may also comprise a post processor to process the prioritized images and an output generator to generate an output, as described with reference to FIG. 9. As discussed above, the multimedia content may include audio/video content, text content, audio content or video content. In case of a text content, appropriate text content analysis may be performed instead of A/V content video analysis, as discussed in reference to FIGS. 5A-5B. The analysis may be performed on text to determine the emotion contained in the text. The same processing may be performed for audio alone—including vocals/non-vocals audio to determine audio emotion probability. Also, the same processing may be performed for video alone to determine video emotion probability. The audio emotion probability may indicate the likelihood of the audio including certain emotion, and the video emotion probability may indicate the likelihood of the video including certain emotion. The system (1000) may also comprise various other entities/units such as Media Device, on device acceleration unit, database, etc., which are known to a person skilled in the art. Hence, the description of such units is not provided brevity of the specification. Further, it should be noted that the system (1000) may be configured to perform the example embodiments of FIGS. 4A-9.

In an example embodiment, the various units 1001, 1003, 1005, 1007, 1009 may be a single processing unit or a number of units, all of which could include multiple computing units. The various units 1001, 1003, 1005, 1007, 1009 may be implemented as one or more microprocessors, microcomputers, microcontrollers, digital signal processors, central processing units, state machines, logic circuitries, and/or any devices that manipulate signals based on operational instructions. Among other capabilities, the processors various units 1001, 1003, 1005, 1007, 1009 may be configured to fetch and execute computer-readable instructions and data stored in the memory. The processors various units 1001, 1003, 1005, 1007, 1009 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an artificial intelligence (AI)-dedicated processor such as a neural processing unit (NPU). One or a plurality of processors control the processing of the input data in accordance with a predefined operating rule or artificial intelligence (AI) model stored in the non-volatile memory and the volatile memory. The predefined operating rule or artificial intelligence model is provided through training or learning.

Figure 4B:
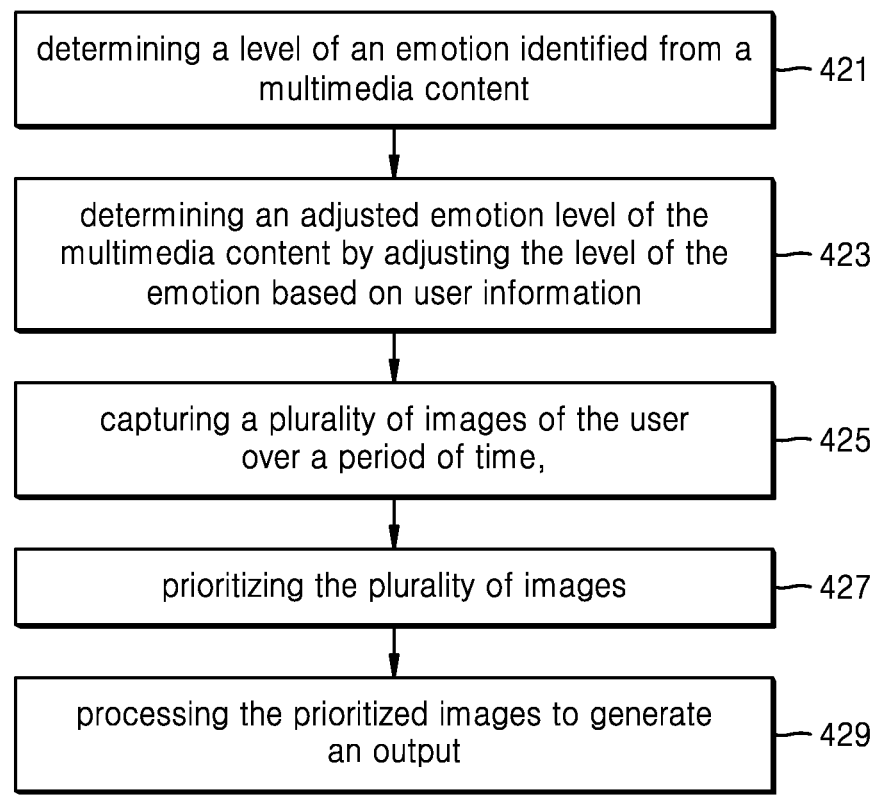
FIG. 4B illustrates a flow chart of a method for automatically capturing and processing an image of a user, in accordance with an example embodiment of the disclosure.

FIG. 4B illustrates a flow chart of a method for automatically capturing and processing an image of a user, in accordance with an example embodiment of the disclosure.

The method 420 comprises determining an emotion level associated with the multimedia content, at operation 421. In an embodiment, emotion may be defined as a feeling contained (or expressed) in the multimedia content and the emotion level may be defined as a degree (or extremeness) of that feeling. In an embodiment, the emotion level may be determined by determining an emotion probability value based on an emotion identified from the multimedia content, using a pre-configured determination model, and determining the emotion level based on the emotion probability value. An example embodiment of determination of the emotion level is described in FIGS. 5A and 5B.

At operation 423, the determined emotion level is adjusted based on user information to determine an adjusted emotion level of the multimedia content. In an embodiment, the user information may include at least one of demographic data of the user, a past usage history of the user, and past sensor biological data. In an embodiment, the adjusted emotion level may be determined by determining an adjustment factor for the emotion based on the user information and determining the adjusted emotion level using the adjustment factor. An example embodiment of determination of the adjusted emotion level is described in FIGS. 6A and 6B. The content's emotion level is a raw quantity of emotion probability.

At operation 425, the method 420 comprises capturing a plurality of images of the user over a period of time, based on the adjusted emotion level being greater than a first threshold and a reaction of the user determined based on the plurality of images, being less than a second threshold. In an embodiment, the plurality of images depicts reaction of the user to the multimedia content. In an embodiment, the first threshold is a minimum expression intensity to recognize static and dynamic facial expressions of the emotion.

At operation 427, the method 420 comprises prioritizing the plurality of images based on at least one of a frame emotion level of the plurality of images, facial features of the user in the plurality of images, or a number of faces in the plurality of images. At operation 429, the method 420 comprises processing the prioritized images to generate an output.

Figure 11:
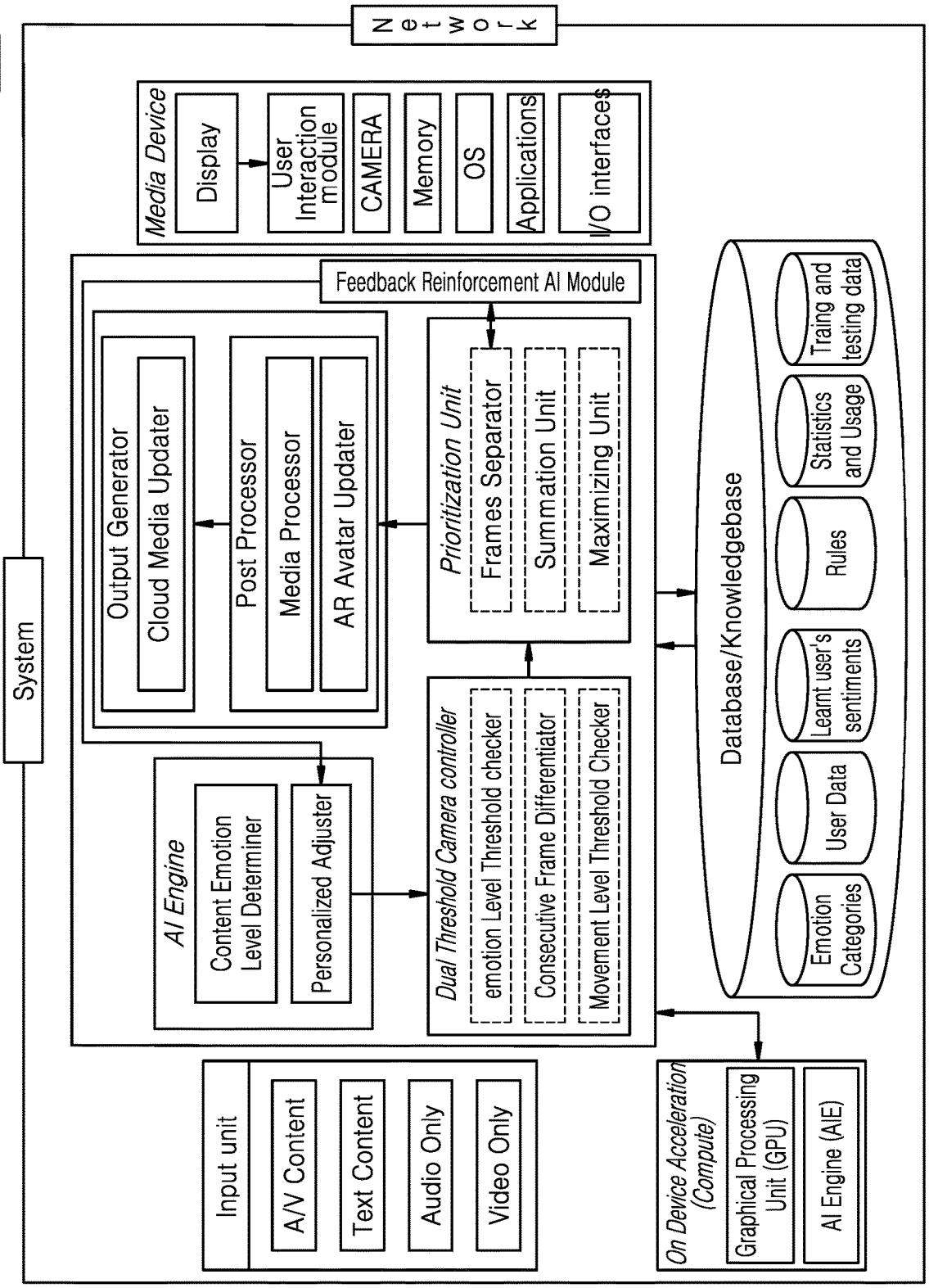
FIG. 11 illustrates a block diagram of a system for automatically capturing and processing an image of a user, in accordance with an example embodiment of the disclosure.

FIG. 11 illustrates a block diagram of a system 1100 for automatically capturing and processing an image of a user, in accordance with an example embodiment of the disclosure. As shown in FIG. 11, an additional AR avatar updater has been provided in the post processor. In this embodiment, the disclosed method may perform a full frame processing in a consecutive frame differentiator, i.e., the entire frame may be processed instead of processing the recorded media only around the face of user. Other than the additional AR avatar updater, the system 1100 functions in similar way as discussed in reference to FIG. 10.

Figure 12:
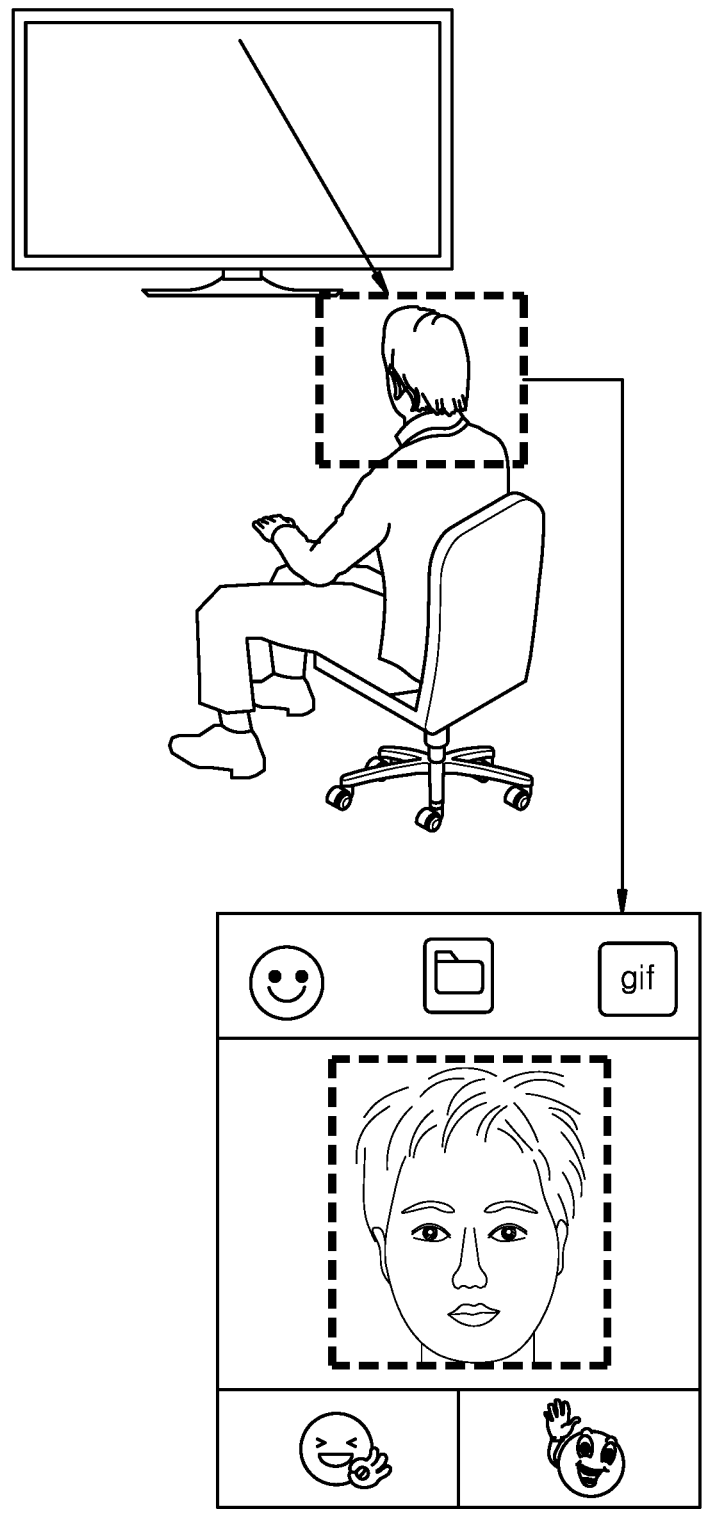
FIGS. 12-14 illustrate various example applications of a mechanism, in accordance with example embodiments of the disclosure.
Figure 13:
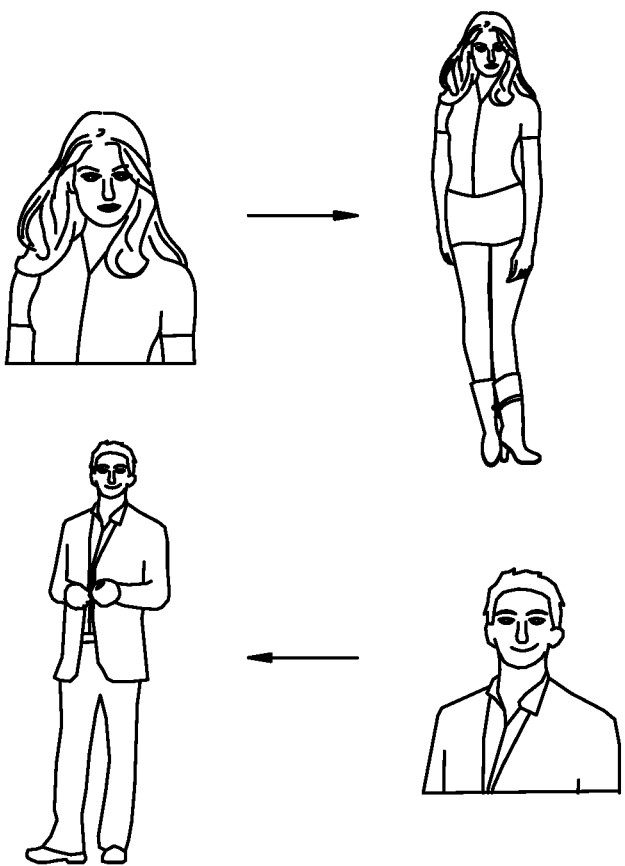
Figure 14:
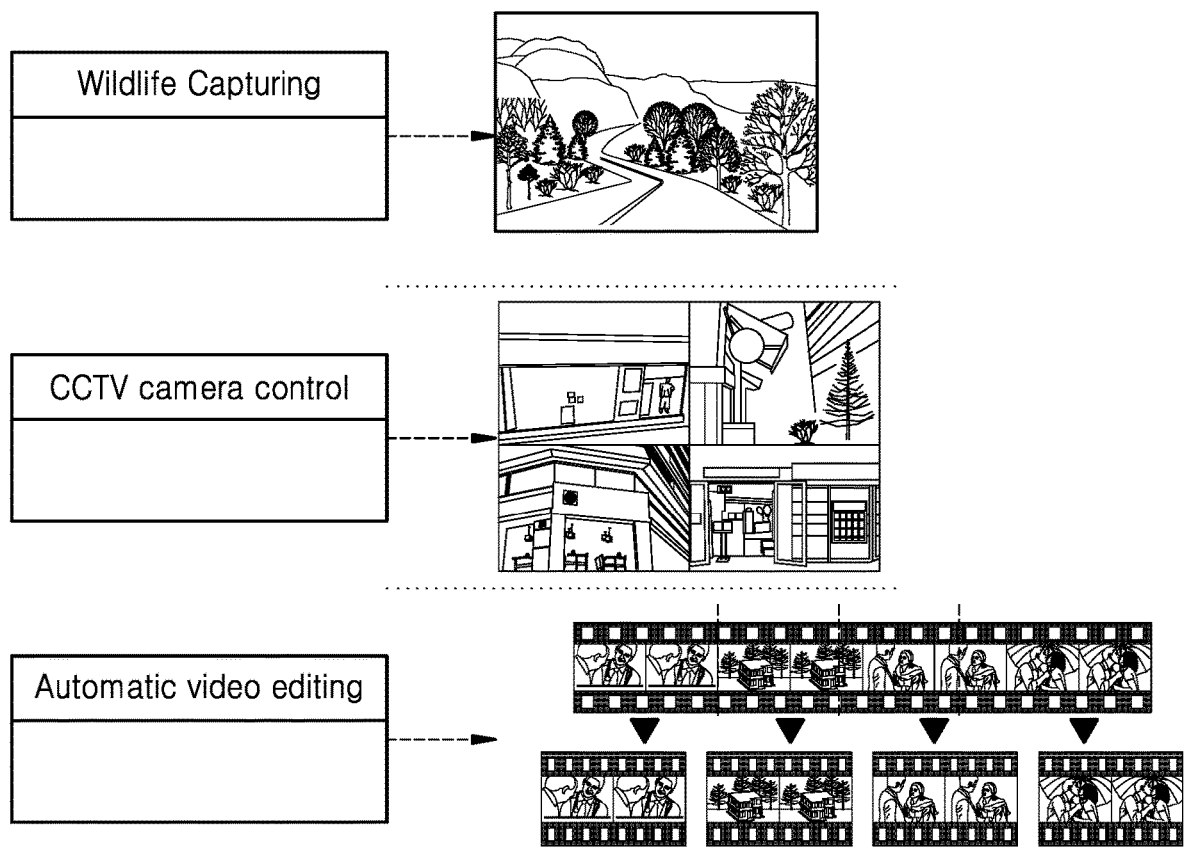

FIGS. 12-14 illustrate various example applications based on a mechanism, in accordance with example embodiment of the disclosure. For examples, FIGS. 12 and 13 show a few possible outputs generated by the techniques of the disclosure, such as a personalized picture of the user based on the content watched by the user, and a personalized 2D/3D avatar of the user. Similarly, FIG. 14 shows few use case scenarios of the disclosure, which are discussed here below:

1) Wildlife Capturing: Smart camera control may be used to detect a rare animal and any motion in the animal to capture meaningful moments of the animal. Particularly, the camera may be left for hours or days to capture, by itself, relevant pictures of the wildlife. It saves the user's time to wait for perfect movement to capture an image of the wildlife as well as save storage by capturing only relevant media.

2) Closed circuit television (CCTV) camera control: Instead of recording everything, smart cameras may be used at quite places such as museums, libraries, etc. to capture only relevant AV content Particularly, using smart security cameras at quite places allows the camera to automatically capture any motion detected. It saves storage and saves time to analyze the security footages for relevant content.

3) Automatic video editing: Smart cameras may be used to record and apply basic video editing features such as trimming, scaling, etc. to the content according to relevance of context. Particularly, basic editing features may be applied in real time while capturing the video based on the context relevance. The feature may be used in film making and video editing for short video creation.

Figure 15A:
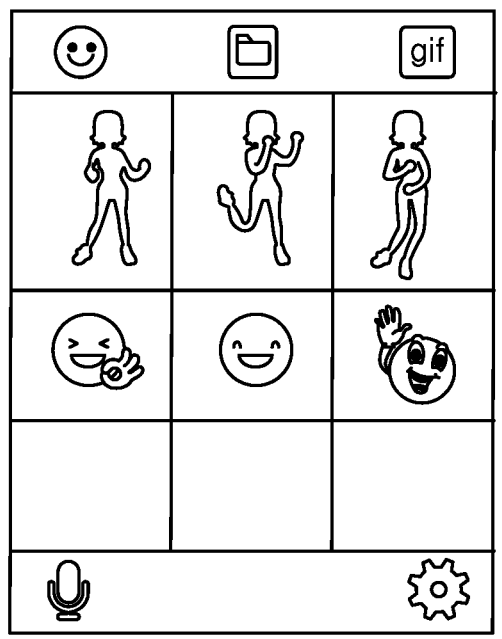
FIGS. 15A and 15B illustrate comparison between the related art and an example embodiment of the disclosure.
Figure 15B:
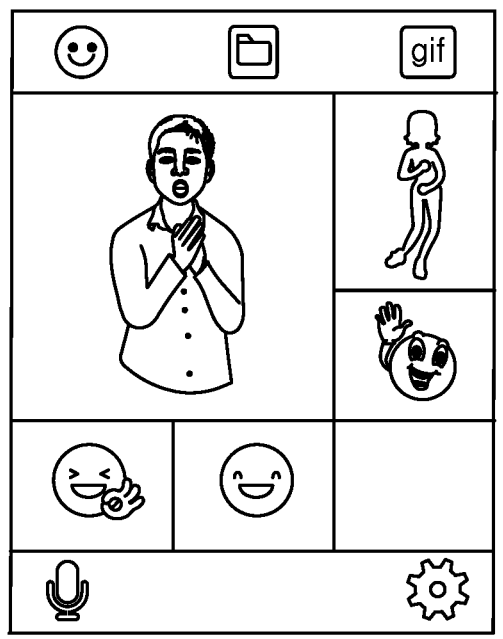

FIGS. 15A and 15B illustrate comparison between the related art and an example embodiment of the disclosure. As shown in FIG. 15A, the related art technologies have below drawbacks:

1. Lack of variety—A fixed set of GIFs and stickers available;
2. Search for best fit—A user needs to search across available options to best express their reaction;
3. AR emoji with fixed emotions—AR emoji has limitation to express actions and emotions; and
4. Manual generation of avatars required—there is no method of automatic GIFs generating method.

On the other hand, as shown in FIG. 15B, the techniques according to an example embodiment provide have below advantages:

1. Increased variety—Added variety in GIFs and stickers, based on an amount of multimedia content watched;
2. Search amongst real emotions—A user does not need to search for actions and emotions provided by someone else, and may rather use his or her personal sets of reactions;
3. Automatic generation of stickers and GIFs—A user device may automatically generate the stickers and GIFs based on the user's reactions, for the user to use to express emotion; and
4. Automatic avatar generation—A personalized avatar able to mimic emotions may be automatically created from the media generated.

Figure 16:
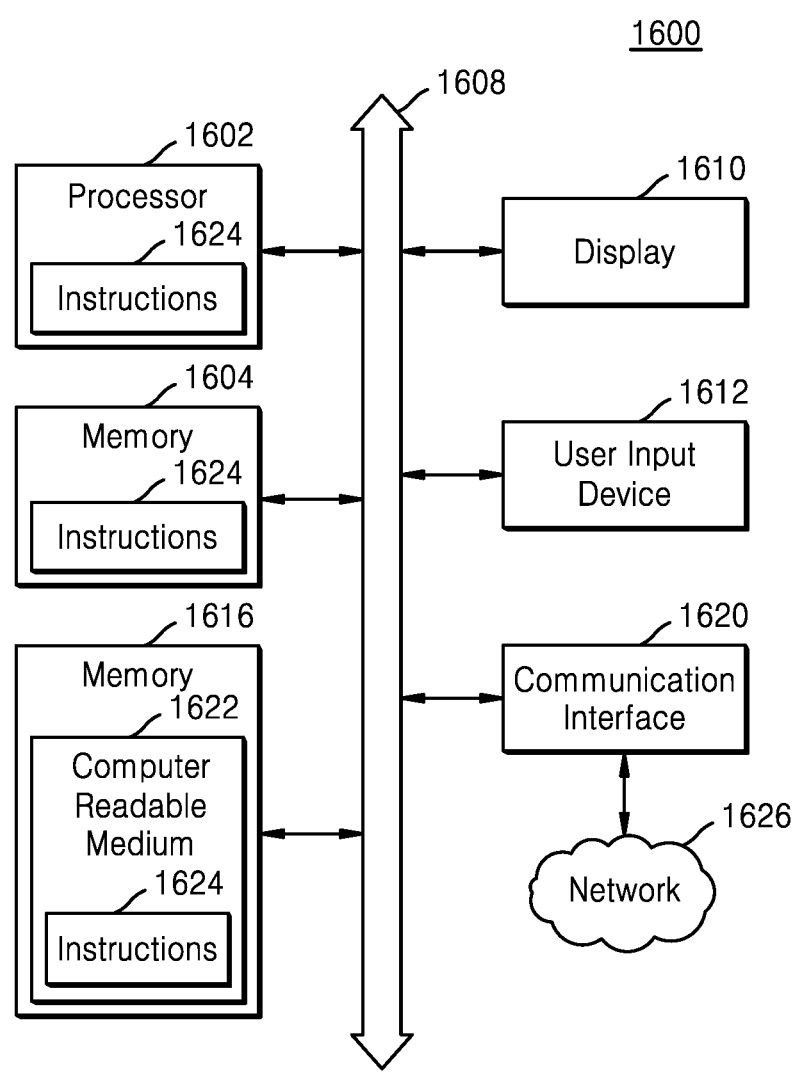
FIG. 16 illustrates a system architecture, in accordance with an example embodiment of the disclosure.

FIG. 16 illustrates system architecture, in accordance with the embodiment of the disclosure, and shows an example hardware configuration of the system 1000 in the form of a computer system 1600. The computer system 1600 may include a set of instructions that may be executed to cause the computer system 1600 to perform any one or more of operations of the methods disclosed. The computer system 1600 may operate as a standalone device or may be connected, e.g., using a network, to other computer systems or peripheral devices.

In a networked deployment, the computer system 1600 may operate in the capacity of a server or as a client user computer in a server-client user network environment, or as a peer computer system in a peer-to-peer (or distributed) network environment. The computer system 1600 may also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1600 is illustrated, the term "system" should also be construed as including any collection of systems or sub-systems that individually or jointly execute a set, or multiple sets, of instructions to perform one or more computer functions.

The computer system 1600 may include a processor 1602, e.g., a central processing unit (CPU), a graphics processing unit (GPU), or both. The processor 1602 may be a component in a variety of systems. For example, the processor 1602 may be part of a standard personal computer or a workstation. The processor 1602 may be one or more general processors, digital signal processors, application-specific integrated circuits, field-programmable gate arrays, servers, networks, digital circuits, analog circuits, combinations thereof, or other now known or later developed devices for analyzing and processing data. The processor 1602 may implement a software program, such as code generated manually (i.e., programmed).

The computer system 1600 may include a memory 1604 that may communicate via a bus 1608. The memory 1604 may include, but is not limited to, computer-readable storage media such as various types of volatile and non-volatile storage media, including but not limited to a random access memory, a read-only memory, a programmable read-only memory, an electrically programmable read-only memory, an electrically erasable read-only memory, a flash memory, a magnetic tape or disk, an optical media and the like. In one example, the memory 1604 includes a cache or a random access memory for the processor 1602. In an alternative example, the memory 1604 is separate from the processor 1602, such as a cache memory of a processor, the system memory, or other memory. The memory 1604 may be an external storage device or database for storing data. The memory 1604 is operable to store instructions executable by the processor 1602. The functions, acts or tasks illustrated in the figures or described may be performed by the programmed processor 1602 for executing the instructions stored in the memory 1604. The functions, acts or tasks are independent of a particular type of an instructions set, storage media, a processor or a processing strategy and may be performed by software, hardware, integrated circuits, firmware, micro-code and the like, operating alone or in combination. Likewise, processing strategies may include multiprocessing, multitasking, parallel processing and the like.

The computer system 1600 may or may not further include a display 1610, such as a liquid crystal display (LCD), an organic light-emitting diode (OLED), a flat panel display, a solid-state display, a cathode ray tube (CRT), a projector, a printer or other now known or later developed display device for outputting determined information. The display 1610 may act as an interface for the user to receive a result of the functioning of the processor 1602, or specifically as an interface associated with the software stored in the memory 1604 or a drive unit 1616.

Additionally, the computer system 1600 may include a user input device 1612 configured to allow a user to interact with any of the components of system 1600. The computer system 1600 may also include the drive unit 1616 (e.g., a disk or optical drive unit). The disk drive unit 1616 may include a computer-readable medium 1622 in which one or more sets of instructions 1624, e.g., software, may be embedded. Further, the instructions 1624 may embody one or more of the methods or logic as described. In an example, the instructions 1624 may reside completely, or at least partially, within the memory 1604 or within the processor 1602 during execution by the computer system 1600.

The disclosure contemplates a computer-readable medium that includes instructions 1624 or receives and executes the instructions 1624 responsive to a propagated signal so that a device connected to a network 1626 may communicate voice, video, audio, images, or any other data over the network 1626. Further, the instructions 1624 may be transmitted or received over the network 1626 via a communication port or interface 1620 or using the bus 1608. The communication port or interface 1620 may be a part of the processor 1602 or maybe a separate component. The communication port 1620 may be created in software or maybe a physical connection in hardware. The communication port 1620 may be configured to connect with the network 1626, external media, the display 1610, or any other components in system 1600, or a combination(s) thereof. The connection with the network 1626 may be a physical connection, such as a wired Ethernet connection or may be established wirelessly. Likewise, the additional connections with other components of the system 1600 may be physical or may be established wirelessly. The network 1626 may alternatively be directly connected to the bus 1608.

The network 1626 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

At least by virtue of aforementioned features, example embodiments of the disclosure provide a method for automatically controlling an image capturing unit such as a camera to capture a real time reaction of a user while watching, reading, and/or listening to a multimedia content. Also, example embodiments of the disclosure prioritize images of the user based on user reaction, and generate personalized media using the prioritized images.

While specific language has been used to describe the disclosure, any limitations arising on account of the same are not intended. As would be apparent to a person in the art, various working modifications may be made to the method according to the inventive concept of the disclosure.

The drawings and the forgoing description give examples of embodiments. Those skilled in the art would appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow chart do not need to be performed in the order shown, nor do all of the actions necessarily need to be performed. Also, those acts that are not dependent on other acts may be performed in parallel with the other acts. The scope of example embodiments is by no means limited by these specific examples. Numerous variations, whether explicitly given in the specification, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

According to an aspect of an example embodiment of the disclosure, provided is a method for automatically capturing and processing an image of a user, the method including: determining a level of an emotion identified from a multimedia content; determining an adjusted emotion level of the multimedia content by adjusting the level of the emotion based on user information, turning-on an image capturing device to capture a plurality of images of the user over a period of time, based on the adjusted emotion level being greater than a first threshold; turning-off the image capturing device, based on a reaction of the user, determined based on the plurality of images, being less than a second threshold, prioritizing the plurality of images based on at least one of a frame emotion level of the plurality of images, facial features of the user in the plurality of images, or a number of faces in the plurality of images; and processing the prioritized images to generate an output. The method may include determining a level of an emotion identified from a multimedia content. The method may include determining an adjusted emotion level of the multimedia content by adjusting the level of the emotion based on user information. The method may include capturing a plurality of images of the user over a period of time, based on the adjusted emotion level being greater than a first threshold and a reaction of the user determined based on the plurality of images, being less than a second threshold. The method may include prioritizing the plurality of images based on at least one of a frame emotion level of the plurality of images, facial features of the user in the plurality of images, or a number of faces in the plurality of images. The method may include processing the prioritized images to generate an output.

According to an embodiment of the disclosure, the determining the level of the emotion level of the multimedia content may include determining, by using a pre-configured determination model, an emotion probability value based on an the emotion identified from the multimedia content, using a pre-configured determination model. The determining the level of the emotion level of the multimedia content may include determining the level of the emotion level based on the emotion probability value.

According to an embodiment of the disclosure, the determining the adjusted emotion level may include determining an adjustment factor for the emotion based on the user information. The user information may include at least one of demographic data of the user, a past usage history of the user, or past sensor biological data. The determining the adjusted emotion level may include determining the adjusted emotion level based on the adjustment factor.

According to an embodiment of the disclosure, the first threshold may be determined by retrieving, from an emotion threshold table, a value corresponding to the identified emotion.

According to an embodiment of the disclosure, the first threshold may be a minimum expression intensity for at least one of static and dynamic facial expressions of the emotion to be detected.

According to an embodiment of the disclosure, the second threshold may be determined by determining a position of the user in a current captured image and a previous captured image, the second threshold may be determined by determining a difference in the current captured image and the previous captured image, based on an area corresponding to the position of the user in the current captured image and the previous captured image, and determining a change in the reaction of the user based on the difference, to determine the second threshold.

According to an embodiment of the disclosure, the prioritizing the plurality of images may include categorizing the plurality of images into at least one set of frames, wherein each set of frames comprises images of the user corresponding to a predefined emotion category. The prioritizing the plurality of images may include obtaining, for each of the at least one set of frames, a frame emotion level from images included in each set of frames. The prioritizing the plurality of images may include generating a priority value by applying a predetermined function to the obtained frame emotion level in each set of frames, wherein the predetermined function includes weighted summation of the frame emotion level of each set of frames. The prioritizing the plurality of images may include prioritizing the images in each set of frames based on the priority value.

According to an embodiment of the disclosure, the frame emotion level of a set of frames may be obtained by determining the frame emotion level based on a weighted sum of emotion values of images included in the set of frames.

According to an embodiment of the disclosure, the predetermined function may include determining a facial priority value by determining a presence of at least one predefined facial feature in the images of each set of frame, wherein each of the at least one predefined facial feature is assigned a predetermined weight. The predetermined function may include determining the facial priority value based on the presence of the at least one predefined facial feature and the predetermined weight.

According to an embodiment of the disclosure, the processing of the prioritized images may include enhancing the prioritized images. The processing of the prioritized images may include generating a new media content from the prioritized images. The processing of the prioritized images may include obtaining a health index of the user. The processing of the prioritized images may include editing the multimedia content. The processing of the prioritized images may include enhancing the prioritized images, or generating a new media content from the prioritized images, The processing of the prioritized images may include obtaining a health index of the user, or editing the multimedia content. The processing of the prioritized images may include enhancing the prioritized images, or obtaining a health index of the user, The processing of the prioritized images may include generating a new media content from the prioritized images, or editing the multimedia content. The processing of the prioritized images may include generating a new media content from the prioritized images, obtaining a health index of the user, or editing the multimedia content. The processing of the prioritized images may include enhancing the prioritized images, obtaining a health index of the user, or editing the multimedia content. The processing of the prioritized images may include enhancing the prioritized images, generating a new media content from the prioritized images, or editing the multimedia content. The processing of the prioritized images may include enhancing the prioritized images, generating a new media content from the prioritized images, or obtaining a health index of the user. The processing of the prioritized images may include enhancing the prioritized images, generating a new media content from the prioritized images, obtaining a health index of the user, or editing the multimedia content. Enhancing may include adjusting at least one of blur, lighting, sharpness, or color content in the prioritized images. The new media content may include at least one of an emoji, an avatar, a video, an audio, or an animated image of the user. The health index may indicate a mood of the user. Editing may include at least one of zooming, trimming, or animating the multimedia content.

According to an embodiment of the disclosure, the multimedia content may include at least one of a audio and video content, a text content, an audio content or a video content.

According to an embodiment of the disclosure, the multimedia content may include at least one of a live content or a stored content.

According to an aspect of an example embodiment of the disclosure, provided is an electronic device for automatically capturing and processing an image of a user. The electronic device may include at least one processor The at least one processor may be configured to determine a level of an emotion identified from a multimedia content. The at least one processor may be configured to determine an adjusted emotion level of the multimedia content by adjusting the level of the emotion based on user information. The at least one processor may be configured to capture a plurality of images of the user over a period of time, based on the adjusted emotion level being greater than a first threshold and a reaction of the user determined based on the plurality of images, being less than a second threshold. The at least one processor may be configured to prioritize the plurality of images based on at least one of a frame emotion level of the plurality of images, facial features of the user in the plurality of images, or a number of faces in the plurality of images. The at least one processor may be configured to process the prioritized images to generate an output.

According to an embodiment of the disclosure, the at least one processor may be configured to determine the level of the emotion by determining, by using a pre-configured determination model, an emotion probability value based on the emotion identified from the multimedia content. The at least one processor may be configured to determine the level of the emotion by determining the level of the emotion based on the emotion probability value.

According to an embodiment of the disclosure, the at least one processor may be configured to determine the level of the emotion by determining, by using a pre-configured determination model, an emotion probability value based on the emotion identified from the multimedia content. The at least one processor may be configured to determine the level of the emotion by determining the level of the emotion based on the emotion probability value.

According to an embodiment of the disclosure, the at least one processor may be configured to determine the adjusted emotion level by determining an adjustment factor for the emotion based on the user information, wherein the user information comprises at least one of demographic data of the user, a past usage history of the user, or past sensor biological data. The at least one processor may be configured to determine the adjusted emotion level by determining the adjusted emotion level based on the adjustment factor.

According to an embodiment of the disclosure, the at least one processor may be configured to determine the first threshold by retrieving, from an emotion threshold table, a value corresponding to the identified emotion.

According to an embodiment of the disclosure, the first threshold may be a minimum expression intensity for at least one of static and dynamic facial expressions of the emotion to be detected.

According to an embodiment of the disclosure, the at least one processor may be configured to determine the second threshold by determining a position of the user in a current captured image and a previous captured image. The at least one processor may be configured to determine the second threshold by determining a difference in the current captured image and the previous captured image, based on an area corresponding to the position of the user in the current captured t image and the previous captured image, and determining a change in the reaction of the user based on the difference, to determine the second threshold.

According to an embodiment of the disclosure, the at least one processor may be configured to prioritize the plurality of images by categorizing the plurality of images into at least one set of frames, wherein each set of frames comprises images of the user corresponding to a predefined emotion category. The at least one processor may be configured to prioritize the plurality of images by obtaining, for each of the at least one set of frames, a frame emotion level from images included in each set of frames. The at least one processor may be configured to prioritize the plurality of images by generating a priority value by applying a predetermined function to the obtained frame emotion level in each set of frames, wherein the predetermined function includes weighted summation of the frame emotion level of each set of frames. The at least one processor may be configured to prioritize the plurality of images by prioritizing the images in each set of frames based on the priority value.

According to an embodiment of the disclosure, the at least one processor may be configured to obtain the frame emotion level of a set of frames by determining the frame emotion level based on a weighted sum of emotion values of images included in the set of frames.

According to an embodiment of the disclosure, the at least one processor may be configured to determine a facial priority value. The at least one processor may be configured to determine a presence of at least one predefined facial feature in the images of each set of frame, wherein each of the at least one predefined facial feature is assigned with a predetermined weight. The at least one processor may be configured to determine the facial priority value based on the presence of the at least one predefined facial feature and the predetermined weight.

According to an embodiment of the disclosure, the at least one processor may be configured to process the prioritized images may include enhancing the prioritized images. The at least one processor may be configured to generate a new media content from the prioritized images. The at least one processor may be configured to obtain a health index of the user. The at least one processor may be configured to edit the multimedia content. The at least one processor may be configured to enhance the prioritized images, or generating a new media content from the prioritized images. The at least one processor may be configured to obtain a health index of the user, or editing the multimedia content. The at least one processor may be configured to enhance the prioritized images, or obtain a health index of the user. The at least one processor may be configured to generate a new media content from the prioritized images, or edit the multimedia content. The at least one processor may be configured to generate a new media content from the prioritized images, obtain a health index of the user, or edit the multimedia content. The at least one processor may be configured to enhance the prioritized images, obtain a health index of the user, or edit the multimedia content. The at least one processor may be configured to enhance the prioritized images, generate a new media content from the prioritized images, or edit the multimedia content. The at least one processor may be configured to enhance the prioritized images, generate a new media content from the prioritized images, or obtain a health index of the user. The at least one processor may be configured to enhance the prioritized images, generate a new media content from the prioritized images, obtain a health index of the user, or edit the multimedia content. Enhancing may include adjusting at least one of blur, lighting, sharpness, or color content in the prioritized images. The new media content may include at least one of an emoji, an avatar, a video, an audio, or an animated image of the user. The health index may indicate a mood of the user. Editing may include at least one of zooming, trimming, or animating the multimedia content.

According to an embodiment of the disclosure, the multimedia content may include at least one of an audio and video content, a text content, an audio content, or a video content According to an embodiment of the disclosure, the multimedia content may include a live content or a stored content.

According to an aspect of an example embodiment of the disclosure, provided is a computer-readable medium. The computer-readable medium storing instructions that, when executed by one or more processors of an electronic device. The computer-readable medium may cause the one or more processors to determining a level of an emotion identified from a multimedia content. The computer-readable medium may cause the one or more processors to determining an adjusted emotion level of the multimedia content by adjusting the level of the emotion based on user information. The computer-readable medium may cause the one or more processors to capturing a plurality of images of the user over a period of time, based on the adjusted emotion level being greater than a first threshold and a reaction of the user determined based on the plurality of images, being less than a second threshold. The computer-readable medium may cause the one or more processors to prioritizing the plurality of images based on at least one of a frame emotion level of the plurality of images, facial features of the user in the plurality of images, or a number of faces in the plurality of images. The computer-readable medium may cause the one or more processors to processing the prioritized images to generate an output.

According to an aspect of an example embodiment of the disclosure, provided is a system for automatically capturing and processing an image of a user, the system including at least one processor to implement a determination unit configured to: determine a level of an emotion identified from a multimedia content; and determine an adjusted emotion level of the multimedia content by adjusting the level of the emotion based on user information, a dual threshold camera controller configured to: turn-on an image capturing device to capture a plurality of images of the user over a period of time, based on the adjusted emotion level being greater than a first threshold; turn-off the image capturing device, based on a reaction of the user, determined based on the plurality of images, being less than a second threshold; and a prioritization unit configured to prioritize the plurality of images based on at least one of a frame emotion level of the plurality of images, facial features of the user in the plurality of images, or a number of faces in the plurality of images; and a processing unit configured to process the prioritized images to generate an output.

According to an embodiment, the determination unit may be configured to determine the level of the emotion by determining, by using a pre-configured determination model, an emotion probability value based on the emotion identified from the multimedia content, and determining the level of the emotion based on the emotion probability value.

According to an embodiment, the determination unit may be configured to determine the adjusted emotion level by: determining an adjustment factor for the emotion based on the user information, wherein the user information comprises at least one of demographic data of the user, a past usage history of the user, or past sensor biological data; and determining the adjusted emotion level based on the adjustment factor.

According to an embodiment, the dual threshold camera controller may be configured to determine the first threshold by retrieving, from an emotion threshold table, a value corresponding to the identified emotion.

According to an embodiment, the first threshold may be a minimum expression intensity for at least one of static and dynamic facial expressions of the emotion to be detected.

According to an embodiment, the dual threshold camera controller may be configured to determine the second threshold by determining a position of the user in a current image and a previous image, the current image and the previous image are received from the image capturing device, determining a difference in the current image and the previous image, based on an area corresponding to the position of the user in the current image and the previous image, and determining a change in the reaction of the user based on the difference, to determine the second threshold.

According to an embodiment, the prioritization unit may be configured to prioritize the plurality of images by: categorizing the plurality of images into at least one set of frames, wherein each set of frames comprises images of the user corresponding to a predefined emotion category, obtaining, for each of the at least one set of frames, a frame emotion level from images included in each set of frames, generating a priority value by applying a predetermined function to the obtained frame emotion level in each set of frames, wherein the predetermined function includes weighted summation of the frame emotion level of each set of frames, and prioritizing the images in each set of frames based on the priority value.

According to an embodiment, the prioritization unit may be configured to obtain the frame emotion level of a set of frames by determining the frame emotion level based on a weighted sum of emotion values of images included in the set of frames.

According to an embodiment, the predetermined function may include determining a facial priority value. The prioritization unit may be configured to determine a presence of at least one predefined facial feature in the images of each set of frame, and determine the facial priority value based on the presence of the at least one predefined facial feature and the predetermined weight. The each of the at least one predefined facial feature may be assigned with a predetermined weight.

According to an embodiment, the processing unit may be configured to process the prioritized images by at least one of: enhancing the prioritized images, wherein enhancing comprises adjusting at least one of blur, lighting, sharpness, or color content in the prioritized images, generating new media content based on the prioritized images, wherein the media content comprises at least one of an emoji, an avatar, a video, an audio, or an animated image of the user, obtaining a health index of the user, wherein the health index indicates a mood of the user; or editing the multimedia content, wherein the editing comprises at least one of zooming, trimming or animating the multimedia content.

According to an embodiment, the multimedia content may include at least one of an audio and video content, a text content, an audio content, or a video content.

According to an embodiment, the multimedia content may include a live content or a stored content.

What is claimed is:

1. A method for automatically capturing and processing an image of a user watching, reading, or listening to a multimedia content, the method comprising:
   determining a level of an emotion identified from the multimedia content;
   determining an adjusted emotion level of the multimedia content by adjusting the level of the emotion based on user information;
   capturing a plurality of images of the user over a period of time from when the adjusted emotion level of the multimedia content is greater than a first threshold to when a reaction of the user determined based on the plurality of images is less than a second threshold;
   prioritizing the plurality of images based on at least one of a frame emotion level of the plurality of images, facial features of the user in the plurality of images, or a number of faces in the plurality of images; and
   processing the prioritized images to generate an output.

2. The method according to claim 1, wherein the determining the level of the emotion of the multimedia content comprises:
   determining, by using a pre-configured determination model, an emotion probability value based on the emotion identified from the multimedia content; and
   determining the level of the emotion based on the emotion probability value.

3. The method according to claim 1, wherein the determining the adjusted emotion level comprises:
   determining an adjustment factor for the emotion based on the user information, wherein the user information comprises at least one of demographic data of the user, a past usage history of the user, or past sensor biological data; and determining the adjusted emotion level based on the adjustment factor.

4. The method according to claim 1, wherein the first threshold is determined by retrieving, from an emotion threshold table, a value corresponding to the identified emotion.

5. The method according to claim 1, wherein the first threshold is a minimum expression intensity for at least one of static and dynamic facial expressions of the emotion to be detected.

6. The method according to claim 1, wherein the second threshold is determined by:
  determining a position of the user in a current captured image and a previous captured image; and
  determining a difference in the current captured image and the previous captured image, based on an area corresponding to the position of the user in the current captured image and the previous captured image, and determining a change in the reaction of the user based on the difference, to determine the second threshold.

7. The method according to claim 1, wherein the prioritizing the plurality of images comprises:
  categorizing the plurality of images into at least one set of frames, wherein each set of frames comprises images of the user corresponding to a predefined emotion category;
  obtaining, for each of the at least one set of frames, a frame emotion level from images included in each set of frames;
  generating a priority value by applying a predetermined function to the obtained frame emotion level in each set of frames, wherein the predetermined function includes weighted summation of the frame emotion level of each set of frames; and
  prioritizing the images in each set of frames based on the priority value.

8. The method according to claim 7, wherein the frame emotion level of a set of frames is obtained by:
  determining the frame emotion level based on a weighted sum of emotion values of images included in the set of frames.

9. The method according to claim 7, wherein the predetermined function further includes determining a facial priority value by:
  determining a presence of at least one predefined facial feature in the images of each set of frame, wherein each of the at least one predefined facial feature is assigned a predetermined weight; and
  determining the facial priority value based on the presence of the at least one predefined facial feature and the predetermined weight.

10. The method according to claim 1, wherein the processing of the prioritized images comprises at least one of:
  enhancing the prioritized images, wherein enhancing comprises adjusting at least one of blur, lighting, sharpness, or color content in the prioritized images;
  generating a new media content from the prioritized images, wherein the new media content comprises at least one of an emoji, an avatar, a video, an audio, or an animated image of the user;
  obtaining a health index of the user, wherein the health index indicates a mood of the user; or
  editing the multimedia content, wherein editing comprises at least one of zooming, trimming, or animating the multimedia content.

11. The method according to claim 1, wherein the multimedia content comprises at least one of an audio and video content, a text content, an audio content or a video content.

12. The method according to claim 1, wherein the multimedia content comprises at least one of a live content or a stored content.

13. An electronic device for automatically capturing and processing an image of a user watching, reading, or listening to a multimedia content, the electronic device comprising at least one processor configured to:
  determine a level of an emotion identified from the multimedia content;
  determine an adjusted emotion level of the multimedia content by adjusting the level of the emotion based on user information;
  capture a plurality of images of the user over a period of time from when the adjusted emotion level of the multimedia content is greater than a first threshold to when a reaction of the user determined based on the plurality of images is less than a second threshold;
  prioritize the plurality of images based on at least one of a frame emotion level of the plurality of images, facial features of the user in the plurality of images, or a number of faces in the plurality of images; and
  process the prioritized images to generate an output.

14. The electronic device according to claim 13, wherein the at least one processor is further configured to determine the level of the emotion by:
  determining, by using a pre-configured determination model, an emotion probability value based on the emotion identified from the multimedia content; and
  determining the level of the emotion based on the emotion probability value.

15. A non-transitory computer-readable medium storing instructions that, when executed by one or more processors of an electronic device for automatically capturing and processing an image of a user watching, reading, or listening to a multimedia content, cause the one or more processors to:
  determining a level of an emotion identified from the multimedia content;
  determining an adjusted emotion level of the multimedia content by adjusting the level of the emotion based on user information;
  capturing a plurality of images of the user over a period of time from when the adjusted emotion level of the multimedia content is greater than a first threshold to when a reaction of the user determined based on the plurality of images is less than a second threshold;
  prioritizing the plurality of images based on at least one of a frame emotion level of the plurality of images, facial features of the user in the plurality of images, or a number of faces in the plurality of images; and
  processing the prioritized images to generate an output.

* * * * *